US012586068B2

(12) United States Patent
Wang et al.

(10) Patent No.: US 12,586,068 B2
(45) Date of Patent: Mar. 24, 2026

(54) SYSTEMS AND METHODS FOR DETECTING EMAIL MANIPULATION USING MACHINE LEARNING

(71) Applicant: Walmart Apollo, LLC, Bentonville, AR (US)

(72) Inventors: Weifeng Wang, Santa Clara, CA (US); Jingru Zhou, San Jose, CA (US); Wen Zhang, San Jose, CA (US); Uday B. Akella, San Carlos, CA (US); Kazuo Matsumoto, Santa Clara, CA (US); Hui-Min Chen, Pleasanton, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 23 days.

(21) Appl. No.: 18/428,270

(22) Filed: Jan. 31, 2024

(65) Prior Publication Data

US 2025/0245656 A1      Jul. 31, 2025

(51) Int. Cl.
| | |
|---|---|
| *G06Q 20/40* | (2012.01) |
| *G06F 40/211* | (2020.01) |
| *G06Q 10/107* | (2023.01) |

(52) U.S. Cl.
CPC ........... *G06Q 20/40* (2013.01); *G06F 40/211* (2020.01); *G06Q 10/107* (2013.01)

(58) Field of Classification Search
CPC ..... G06Q 20/40; G06Q 10/107; G06F 40/211
USPC ......................................................... 705/44
See application file for complete search history.

(56) References Cited

U.S. PATENT DOCUMENTS

| | | | | |
|---|---|---|---|---|
| 11,930,034 | B2 * | 3/2024 | Jones | H04L 63/1483 |
| 2004/0221016 | A1 * | 11/2004 | Hatch | H04L 51/212 |
| | | | | 709/207 |
| 2004/0250208 | A1 * | 12/2004 | Nelms | G06F 40/232 |
| | | | | 715/257 |
| 2015/0067833 | A1 * | 3/2015 | Verma | H04L 63/1483 |
| | | | | 726/22 |
| 2016/0012223 | A1 * | 1/2016 | Srivastava | H04L 63/1425 |
| | | | | 726/23 |

(Continued)

FOREIGN PATENT DOCUMENTS

| | | |
|---|---|---|
| CN | 105827521 A | 8/2016 |
| CN | 114841248 A | 8/2022 |
| WO | 2023038574 A1 | 3/2023 |

OTHER PUBLICATIONS

N. J. Euna et al., "Content-based Spam Email Detection Using N-gram Machine Learning Approach," ResearchGate, DOI: 10.20944/preprints202109.0236.v1, (Year: 2021) 11 pages.

(Continued)

*Primary Examiner* — Hai Tran
(74) *Attorney, Agent, or Firm* — Morgan, Lewis & Bockius LLP; Manita Rawat

(57) ABSTRACT

Systems and methods for detecting email manipulation using machine learning are disclosed. In some embodiments, a disclosed method includes: receiving, from a computing device, an email assessment request regarding an email address associated with a user; generating feature data based on the email address; computing, using at least one machine learning model, manipulation indication data of the email address based on the feature data; and transmitting, in response to the email assessment request, the manipulation indication data of the email address to the computing device.

20 Claims, 12 Drawing Sheets

(56)          References Cited

U.S. PATENT DOCUMENTS

2022/0417275 A1 *  12/2022  Jones ................. H04L 63/1483
2024/0356969 A1 *  10/2024  Brabec ................ G06Q 10/107

OTHER PUBLICATIONS

Fraud.net, "Email Tumbling," https://fraud.net/d/email-tumbling/
:~:text=Email%20tumbling%20is%20a%20way, email%20before%
20adding%20other%20text., Downloaded from Internet Nov. 22,
2023, 15 pages.

* cited by examiner

410 apple+123@outlook.com
apple+124@outlook.com
apple+125@outlook.com
apple+126@outlook.com

420 a.p.p.l.e.s9.4@gamil.com
a.p.p.l.e.s94@gamil.com
a.p.p.l.e.s.9.4@gamil.com
a.p.p.l.e.s.9.4@gamil.com

430 apple@adolphcitgo.com
apple@aspendistribution.com
apple@fpesolutionsinc.com
apple@fullservicestorage.com <u>1200</u>

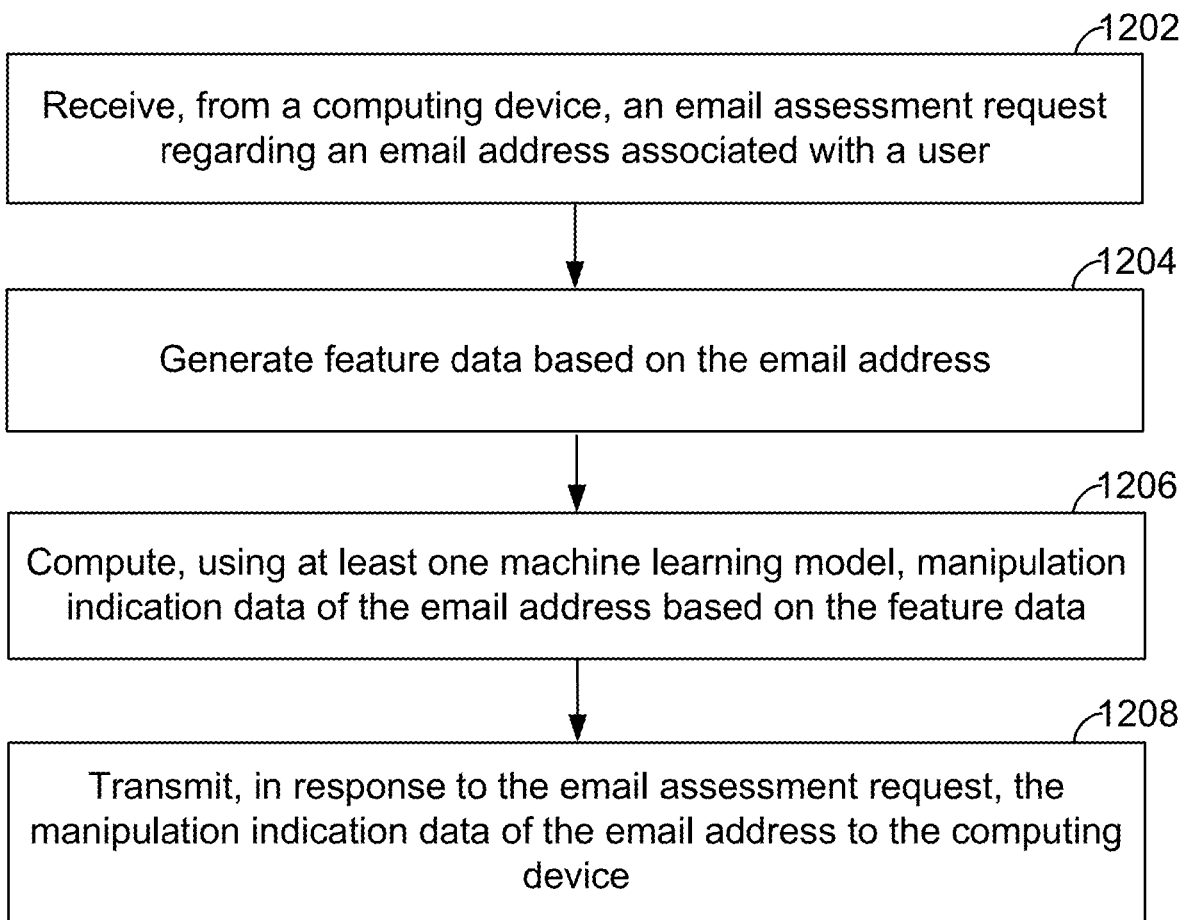

1202

Receive, from a computing device, an email assessment request regarding an email address associated with a user

1204

Generate feature data based on the email address

1206

Compute, using at least one machine learning model, manipulation indication data of the email address based on the feature data

1208

Transmit, in response to the email assessment request, the manipulation indication data of the email address to the computing device

FIG. 12

SYSTEMS AND METHODS FOR DETECTING EMAIL MANIPULATION USING MACHINE LEARNING

TECHNICAL FIELD

This application relates generally to machine learning processes and, more particularly, to systems and methods for detecting email manipulation using machine learning.

BACKGROUND

Some transactions, such as some in-store or online retail transactions, are fraudulent. In one example, a fraudster may attempt to purchase an item using a payment form, such as a credit card, belonging to another person without permission. In another example, if a fraudster gains access to another customer's computer or mobile device, the fraudster may be able to purchase items on a retailer website using the customer's payment forms. In each of these examples, the fraudster is involved in a fraudulent transaction or activity, which may cause time and financial losses of the victimized person, and may also cause financial harm to the retailer. Thus, customers, retailers and other business entities, can benefit from the identification of fraudsters before they perform fraudulent transactions.

Email manipulation is a very typical strategy that fraudsters play with, and it is a critical issue seen not only in online transactions but also in membership sign-up stages. By creating a lot of tumbling or fraudulent emails, fraudsters can easily pass the blocked fraudulent email lists, sign up for memberships of a retailer, place orders and make returns, which would cause serious economic loss for the retailer. In addition, fraud detection for new accounts might be challenging due to lack of data. As such, it is challenging yet desirable to learn how fraudsters manipulate emails for fraud detection and prevention.

SUMMARY

The embodiments described herein are directed to systems and methods for detecting email manipulation using machine learning.

In various embodiments, a system including a non-transitory memory configured to store instructions thereon and at least one processor is disclosed. The at least one processor is operatively coupled to the non-transitory memory and configured to read the instructions to: receive, from a computing device, an email assessment request regarding an email address associated with a user; generate feature data based on the email address; compute, using at least one machine learning model, manipulation indication data of the email address based on the feature data; and transmit, in response to the email assessment request, the manipulation indication data of the email address to the computing device.

In various embodiments, a computer-implemented method is disclosed. The computer-implemented method includes: receiving, from a computing device, an email assessment request regarding an email address associated with a user; generating feature data based on the email address; computing, using at least one machine learning model, manipulation indication data of the email address based on the feature data; and transmitting, in response to the email assessment request, the manipulation indication data of the email address to the computing device.

In various embodiments, a non-transitory computer readable medium having instructions stored thereon is disclosed.

The instructions, when executed by at least one processor, cause at least one device to perform operations including: receiving, from a computing device, an email assessment request regarding an email address associated with a user; generating feature data based on the email address; computing, using at least one machine learning model, manipulation indication data of the email address based on the feature data; and transmitting, in response to the email assessment request, the manipulation indication data of the email address to the computing device.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein:

FIG. 12 is a flowchart illustrating an exemplary method for detecting email manipulation using machine learning, in accordance with some embodiments of the present teaching.

DETAILED DESCRIPTION

Figure 1:
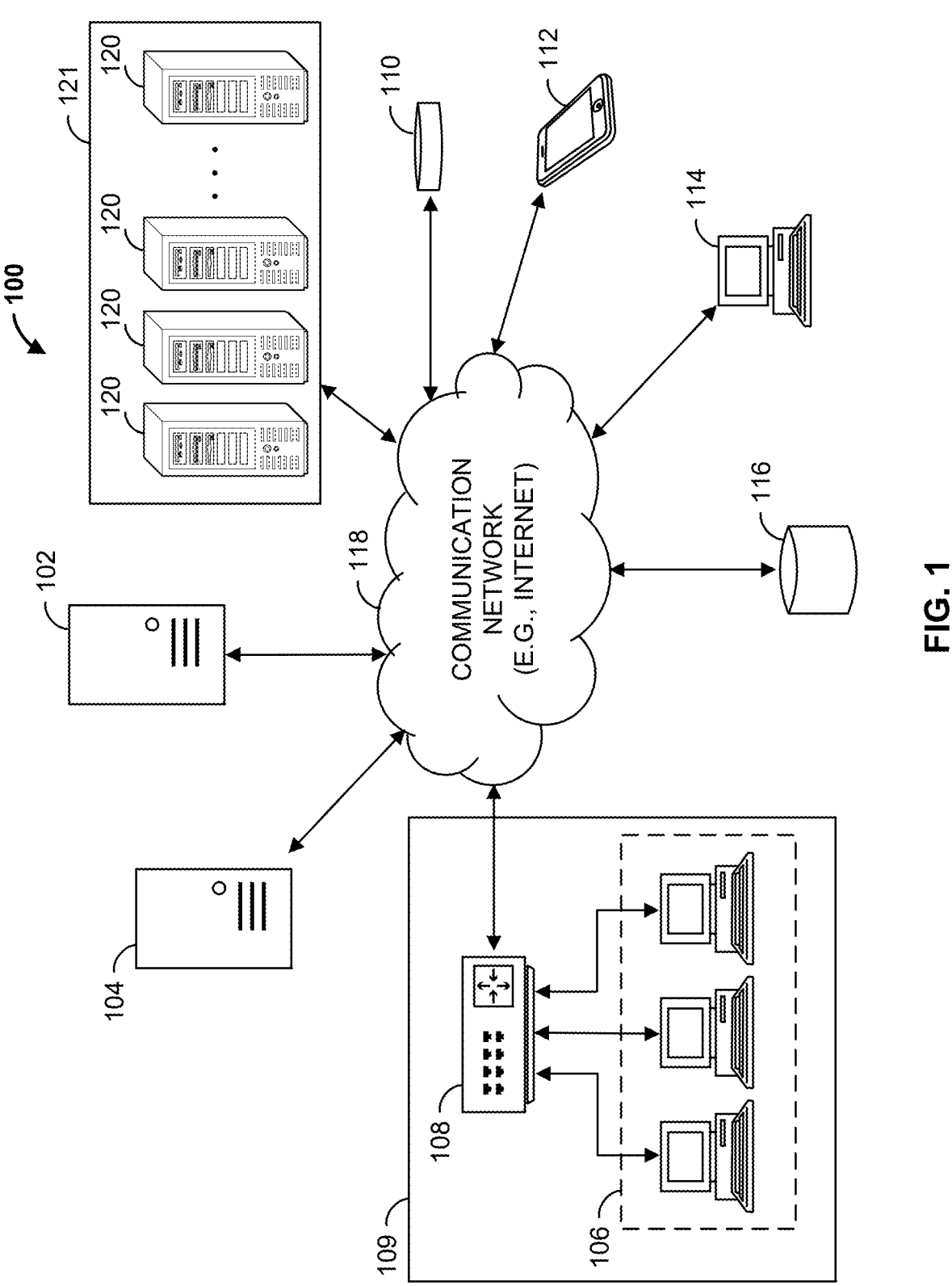
FIG. 1 is a network environment configured for detecting email manipulation using machine learning, in accordance with some embodiments of the present teaching.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

Email is a significant and crucial identity because an email address is required for new account sign-up and existing account sign-in, can be used to link customers and events, and enhance feature generation. At the same time, an email address is likely to be manipulated by fraudsters and could be used to help stopping fraudulent events at the very beginning. It is a critical issue not only in online fraudulent transactions but also in membership abuse. For example, some emails have format rules that can be used for syntax check, and some emails have patterns with identification information. Email manipulation checks based on exact full string match or manual review and flag would be inefficient, biased and time consuming.

One objective of the present teaching is to provide systems and methods for inputting a single email address in an automated real-time email manipulation detection engine, which can detect invalid emails, gibberish emails, and tumbling emails automatically. Invalid emails include emails with an invalid format. Gibberish emails includes random emails with gibberish characters. Tumbling emails include different emails sharing a similar pattern. The outputs of the system could also be implemented to detect risky identities and customers, cluster emails and accounts, link suspicious transactions and returns, and enhance fraud detection models.

In some embodiments, taking a single email address as the input, a disclosed system can effectively detect suspicious email addresses from various aspects, such as invalid format, tumbling, and anomaly patterns due to similarity or dissimilarity. Besides email manipulation detection, it provides highly accurate solutions that can help cluster accounts/events and identify individuals.

In some embodiments, one or more machine learning models, with the ability to self-learn and adapt, are utilized by the disclosed system to learn manipulation patterns instead of matching exact email addresses. Based on pseudo-label generation, the system can handle unsupervised and supervised learning tasks. In some embodiments, a retailer has millions of emails on record which can be used to train the machine learning models.

In some embodiments, the system treats tumbling as an evolutionary process, transforms an email address to a gene matrix with evolutionary information and trains deep learning models like convolutional neural network (CNN) based on the gene matrices. In some embodiments, the system can also detect, e.g. through an n-gram model, the gibberish email address pattern, which is a critical risk indicator for fraud detection.

The disclosed email manipulation detection methods can enhance network graph by providing more powerful linkage for transactions, returns, and chargebacks. In addition, the disclosed methods can help on: customer and fraudster clustering, aligning emails with other identities, fraud and abuse detection, email or account blocklist optimization, and application programming interface (API) optimization for external users. The disclosed systems and methods can be applied to different products or populations, and extended to other domains. For example, the disclosed systems and methods can be applied to other string manipulation tasks, such as mailing address manipulation, without change of the technical details and model structures.

Furthermore, in the following, various embodiments are described with respect to systems and methods for detecting email manipulation using machine learning are disclosed. In some embodiments, a disclosed method includes: receiving, from a computing device, an email assessment request regarding an email address associated with a user; generating feature data based on the email address; computing, using at least one machine learning model, manipulation indication data of the email address based on the feature data; and transmitting, in response to the email assessment request, the manipulation indication data of the email address to the computing device.

Unless specified otherwise, an "email" in this application refers to an "email address," rather than title or content of an email.

Turning to the drawings, FIG. 1 is a network environment 100 configured for detecting email manipulation using machine learning, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, an email manipulation computing device 102, a server 104 (e.g., a web server or an application server), a cloud-based engine 121 including one or more processing devices 120, a database 116, and one or more user computing devices 110, 112, 114 operatively coupled over the network 118. The email manipulation computing device 102, the server 104, the workstation(s) 106, the processing device(s) 120, and the multiple user computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the email manipulation computing device 102 and the processing device(s) 120 can be a computer, a workstation, a laptop, a server such as a cloud-based server, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of the one or more processing devices 120 are offered as a cloud-based service (e.g., cloud computing). For example, the cloud-based engine 121 may offer computing and storage resources of the one or more processing devices 120 to the email manipulation computing device 102.

In some examples, each of the multiple user computing devices 110, 112, 114 can be a cellular phone, a smart phone, a tablet, a personal assistant device, a voice assistant device, a digital assistant, a laptop, a computer, a laser-based code scanner, or any other suitable device. In some examples, the server 104 hosts one or more retailer websites. In some examples, the email manipulation computing device 102, the processing devices 120, and/or the server 104 are operated by a retailer, and the multiple user computing devices 110, 112, 114 are operated by customers and/or advertisers associated with the retailer websites. In some examples, the processing devices 120 are operated by a third party (e.g., a cloud-computing provider).

The workstation(s) 106 are operably coupled to the communication network 118 via a router (or switch) 108. The workstation(s) 106 and/or the router 108 may be located at a store 109 of a retailer, for example. The workstation(s) 106 can communicate with the email manipulation computing device 102 over the communication network 118. The workstation(s) 106 may send data to, and receive data from, the email manipulation computing device 102. For example, the workstation(s) 106 may transmit data identifying items purchased by a customer at the store 109 to the email manipulation computing device 102.

Although FIG. 1 illustrates three user computing devices 110, 112, 114, the network environment 100 can include any number of user computing devices 110, 112, 114. Similarly, the network environment 100 can include any number of the email manipulation computing devices 102, the processing devices 120, the servers 104, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

In some embodiments, each of the first user computing device 110, the second user computing device 112, and the Nth user computing device 114 may communicate with the server 104 over the communication network 118. For example, each of the multiple user computing devices 110, 112, 114 may be operable to view, access, and interact with a website, such as a retailer's website, hosted by the server 104. The server 104 may capture user session data related to a customer's activity (e.g., interactions) on the website.

In some examples, a customer may operate one of the user computing devices 110, 112, 114 to initiate a web browser that is directed to the website hosted by the server 104. The customer may, via the web browser, view item advertisements for items displayed on the website, and may click on item advertisements, for example. The website may capture these activities as user session data, and transmit the user session data to the email manipulation computing device 102 over the communication network 118. The website may also allow the operator to add one or more of the items to an online shopping cart, and allow the customer to perform a "checkout" of the shopping cart to purchase the items. In some examples, the server 104 transmits purchase data identifying items the customer has purchased from the website to the email manipulation computing device 102.

In some examples, a customer may go to a store, e.g. the store 109 for purchasing items. The customer may use some payment method, e.g. a credit card or a payment app, at the store 109 to purchase one or more items. The workstation(s) 106 in the store 109 may capture these activities as in-store purchase data, and transmit the in-store purchase data to the email manipulation computing device 102 over the communication network 118.

In some examples, the email manipulation computing device 102 may receive an email assessment request regarding an email address associated with a user from the server 104. The email assessment request may be sent standalone or together with the email address associated with the user, to seek manipulation check of the email address before granting an online sign-up, sign-in or online transaction. In some examples, the email assessment request may be sent by the store 109 to seek manipulation check of the email address before granting an in-store transaction, a discount, or another benefit to the user in the store 109. In response, the email manipulation computing device 102 generates manipulation indication data for the email address. The manipulation indication data may include: a manipulation indicator indicating whether the email address is manipulated, and/or a manipulation type indicator indicating a type of manipulation for the email address, e.g. invalid email, tumbling email, or gibberish email.

In some examples, the email manipulation computing device 102 may execute one or more models (e.g., programs or algorithms), such as a machine learning model, deep learning model, statistical model, etc., to generate manipulation indication data for an email address. The email manipulation computing device 102 may generate and transmit the manipulation indication data of the email address to the server 104 (or the store 109) over the communication network 118, and the server 104 (or the store 109) may determine whether to proceed on a transaction with the user, or whether to run some fraud check or some verification or authentication process with the user.

In some embodiments, the email manipulation computing device 102 is further operable to communicate with the database 116 over the communication network 118. For example, the email manipulation computing device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the email manipulation computing device 102, in some examples, the database 116 can be a local storage device, such as a hard drive, a non-volatile memory, or a USB stick. The email manipulation computing device 102 may store online purchase data received from the server 104 in the database 116. The email manipulation computing device 102 may receive in-store purchase data from different stores 109 and store them in the database 116. The email manipulation computing device 102 may also receive from the server 104 user session data identifying events associated with browsing sessions, and may store the user session data in the database 116. The email manipulation computing device 102 may also compute manipulation indication data in response to an email assessment request received from the server 104 (or the store 109), and may store the manipulation indication data in the database 116.

In some examples, the email manipulation computing device 102 generates and/or updates different models for detecting email manipulation. The models, when executed by the email manipulation computing device 102, allow the email manipulation computing device 102 to compute manipulation related labels or indicators, and generate manipulation indication data based on the manipulation related labels or indicators.

In some examples, the email manipulation computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units. Based on the output of the models, the email manipulation computing device 102 may generate manipulation indication data.

Figure 2:
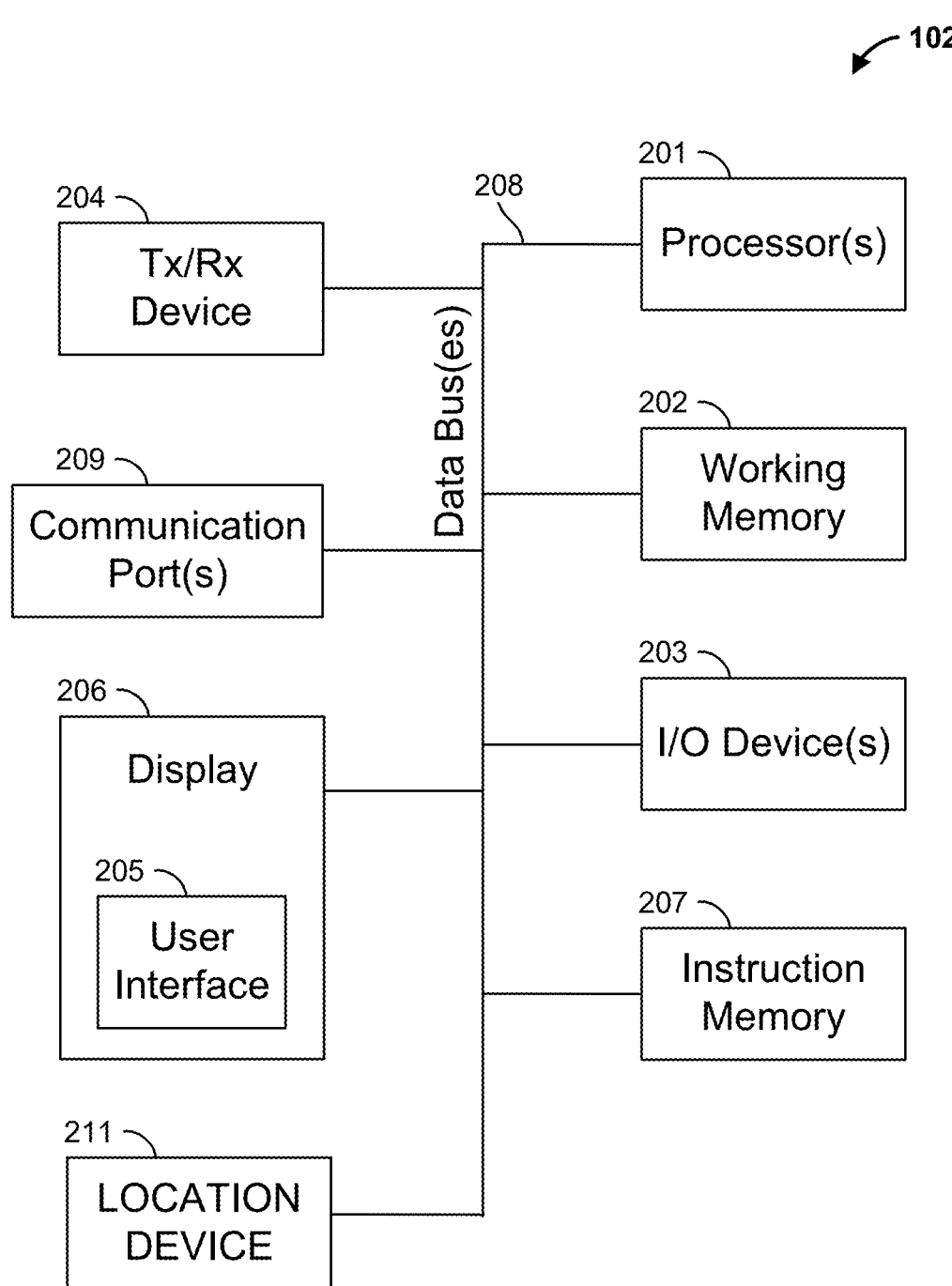
FIG. 2 is a block diagram of an email manipulation computing device, in accordance with some embodiments of the present teaching.

FIG. 2 illustrates a block diagram of an email manipulation computing device, e.g. the email manipulation computing device 102 of FIG. 1, in accordance with some embodiments of the present teaching. In some embodiments, each of the email manipulation computing device 102, the server 104, the multiple user computing devices 110, 112, 114, and the one or more processing devices 120 in FIG. 1 may include the features shown in FIG. 2. Although FIG. 2 is described with respect to certain components shown therein, it will be appreciated that the elements of the email manipulation computing device 102 can be combined, omitted, and/or replicated. In addition, it will be appreciated that additional elements other than those illustrated in FIG. 2 can be added to the email manipulation computing device 102.

As shown in FIG. 2, the email manipulation computing device 102 can include one or more processors 201, an instruction memory 207, a working memory 202, one or more input/output devices 203, one or more communication ports 209, a transceiver 204, a display 206 with a user interface 205, and an optional location device 211, all operatively coupled to one or more data buses 208. The data buses 208 allow for communication among the various components. The data buses 208 can include wired, or wireless, communication channels.

The one or more processors 201 can include any processing circuitry operable to control operations of the email manipulation computing device 102. In some embodiments, the one or more processors 201 include one or more distinct processors, each having one or more cores (e.g., processing circuits). Each of the distinct processors can have the same or different structure. The one or more processors 201 can include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 201 may also be implemented by a controller, a microcontroller, an application specific integrated circuit (ASIC), a field programmable gate array (FPGA), a programmable logic device (PLD), etc.

In some embodiments, the one or more processors 201 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 207 can store instructions that can be accessed (e.g., read) and executed by at least one of the one or more processors 201. For example, the instruction memory 207 can be a non-transitory, computer-readable storage medium such as a read-only memory (ROM), an electrically erasable programmable read-only memory (EE-PROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 201 can be configured to perform a certain function or operation by executing code, stored on the instruction memory 207, embodying the function or operation. For example, the one or more processors 201 can be configured to execute code stored in the instruction memory 207 to perform one or more of any function, method, or operation disclosed herein.

Additionally, the one or more processors 201 can store data to, and read data from, the working memory 202. For example, the one or more processors 201 can store a working set of instructions to the working memory 202, such as instructions loaded from the instruction memory 207. The one or more processors 201 can also use the working memory 202 to store dynamic data created during one or more operations. The working memory 202 can include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 207 and working memory 202, it will be appreciated that the email manipulation computing device 102 can include a single memory unit configured to operate as both instruction memory and working memory. Further, although embodiments are discussed herein including non-volatile memory, it will be appreciated that the email manipulation computing device 102 can include volatile memory components in addition to at least one non-volatile memory component.

In some embodiments, the instruction memory 207 and/or the working memory 202 includes an instruction set, in the form of a file for executing various methods, e.g. any method as described herein. The instruction set can be stored in any acceptable form of machine-readable instructions, including source code or various appropriate programming languages. Some examples of programming languages that can be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 201.

The input-output devices 203 can include any suitable device that allows for data input or output. For example, the input-output devices 203 can include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 204 and/or the communication port(s) 209 allow for communication with a network, such as the communication network 118 of FIG. 1. For example, if the communication network 118 of FIG. 1 is a cellular network, the transceiver 204 is configured to allow communications with the cellular network. In some embodiments, the transceiver 204 is selected based on the type of the communication network 118 the email manipulation computing device 102 will be operating in. The one or more processors 201 are operable to receive data from, or send data to, a network, such as the communication network 118 of FIG. 1, via the transceiver 204.

The communication port(s) 209 may include any suitable hardware, software, and/or combination of hardware and software that is capable of coupling the email manipulation computing device 102 to one or more networks and/or additional devices. The communication port(s) 209 can be arranged to operate with any suitable technique for controlling information signals using a desired set of communications protocols, services, or operating procedures. The communication port(s) 209 can include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 209 allows for the programming of executable instructions in the instruction memory 207. In some embodiments, the communication port(s) 209 allow for the transfer (e.g., uploading or downloading) of data, such as machine learning model training data.

In some embodiments, the communication port(s) 209 are configured to couple the email manipulation computing device 102 to a network. The network can include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments can include in-body communications, various devices, and various modes of communications such as wireless communications, wired communications, and combinations of the same.

In some embodiments, the transceiver 204 and/or the communication port(s) 209 are configured to utilize one or more communication protocols. Examples of wired protocols can include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols can include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 206 can be any suitable display, and may display the user interface 205. For example, the user interfaces 205 can enable user interaction with the email manipulation computing device 102 and/or the server 104. For example, the user interface 205 can be a user interface for an application of a network environment operator that allows a customer to view and interact with the operator's website. In some embodiments, a user can interact with the user interface 205 by engaging the input-output devices 203. In some embodiments, the display 206 can be a touchscreen, where the user interface 205 is displayed on the touchscreen.

The display 206 can include a screen such as, for example, a Liquid Crystal Display (LCD) screen, a light-emitting diode (LED) screen, an organic LED (OLED) screen, a movable display, a projection, etc. In some embodiments, the display 206 can include a coder/decoder, also known as Codecs, to convert digital media data into analog signals. For example, the visual peripheral output device can include video Codecs, audio Codecs, or any other suitable type of Codec.

The optional location device 211 may be communicatively coupled to a location network and operable to receive position data from the location network. For example, in some embodiments, the location device 211 includes a GPS device configured to receive position data identifying a latitude and longitude from one or more satellites of a GPS constellation. As another example, in some embodiments, the location device 211 is a cellular device configured to receive location data from one or more localized cellular towers. Based on the position data, the email manipulation computing device 102 may determine a local geographical area (e.g., town, city, state, etc.) of its position.

In some embodiments, the email manipulation computing device 102 is configured to implement one or more modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
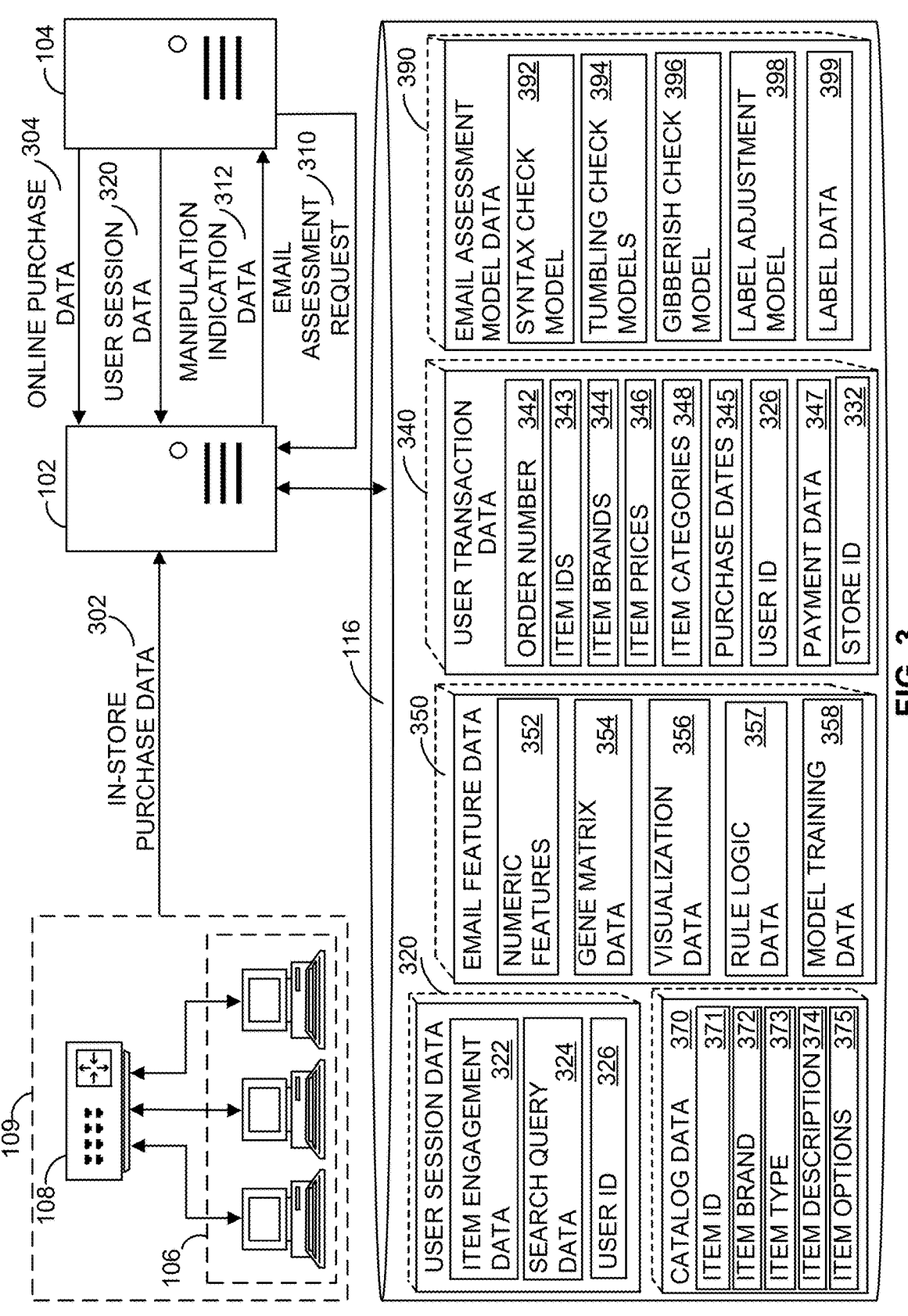
FIG. 3 is a block diagram illustrating various portions of a system for detecting email manipulation using machine learning, in accordance with some embodiments of the present teaching.

FIG. 3 is a block diagram illustrating various portions of a system for detecting email manipulation using machine learning, e.g. the system shown in the network environment 100 of FIG. 1, in accordance with some embodiments of the present teaching. As indicated in FIG. 3, the email manipulation computing device 102 may receive user session data 320 from the server 104, and store the user session data 320 in the database 116. The user session data 320 may identify, for each user (e.g., customer), data related to that user's browsing session, such as when browsing a retailer's webpage hosted by the server 104.

In some examples, the user session data 320 may include item engagement data 322, search query data 324, and user ID 326 (e.g., a customer ID, retailer website login ID, a cookie ID, etc.). The item engagement data 322 may include one or more of a session ID (i.e., a website browsing session identifier), item clicks identifying items which a user clicked (e.g., images of items for purchase, keywords to filter reviews for an item), items added-to-cart identifying items added to the user's online shopping cart, advertisements viewed identifying advertisements the user viewed during the browsing session, and advertisements clicked identifying advertisements the user clicked on. The search query data 324 may identify one or more searches conducted by a user during a browsing session (e.g., a current browsing session). The email manipulation computing device 102 may also receive online purchase data 304 from the server 104, which identifies and characterizes one or more online purchases, such as purchases made by the user and other users via a retailer's website hosted by the server 104. The email manipulation computing device 102 may also receive in-store purchase data 302 from the store 109, which identifies and characterizes one or more in-store purchases. In some embodiments, the in-store purchase data 302 may also indicate other information about the store 109.

The email manipulation computing device 102 may parse the in-store purchase data 302 and the online purchase data 304 to generate user transaction data 340. In this example, the user transaction data 340 may include, for each purchase, one or more of: an order number 342 identifying a purchase order, item IDs 343 identifying one or more items purchased in the purchase order, item brands 344 identifying a brand for each item purchased, item prices 346 identifying the price of each item purchased, item categories 348 identifying a product type (or category) of each item purchased, purchase dates 345 identifying the purchase dates of the purchase orders, a user ID 326 for the user making the corresponding purchase, payment data 347 indicating payment methods and related information (e.g. emails associated with payment) for corresponding online orders, and store ID 332 for the corresponding in-store purchase, or for the pickup store or shipping-from store associated with the corresponding online purchase.

In some embodiments, the database 116 may further store email feature data 350, which may identify feature data related to email addresses associated with users of the stores 109 or e-commerce platforms (shopping website and/or shopping app) hosted by the server 104. The email feature data 350 may include, for each email address, numeric features data 352, gene matrix data 354, visualization data 356, rule logic data 357, and model training data 358. In some examples, the numeric features data 352 identifies numeric features related to email addresses, e.g. maximum length of repeated character, length of pattern, length of longest number, length of continuous substring, length of the longest repeated substring, and number of substrings in the email addresses. In some examples, the gene matrix data 354 identifies data related to gene matrices generated to represent an evolutionary process of a potentially (tumbling) email address. In some examples, the visualization data 356 identifies data related to image visualizations showing patterns and clusters of tumbling emails. In some examples, the rule logic data 357 identifies rules and logics used to compute email manipulation scores or labels. In some examples, the model training data 358 identifies features and data for training machine learning models or other related models for generating manipulation indication data.

In some embodiments, the database 116 may further store catalog data 370, which may identify one or more attributes of a plurality of items, such as a portion of or all items a retailer carries in stores and/or at e-commerce platforms. The catalog data 370 may identify, for each of the plurality of items, an item ID 371 (e.g., an SKU number), item brand 372, item type 373 (e.g., grocery item such as milk, clothing item), item description 374 (e.g., a description of the product including product features, such as ingredients, benefits, use or consumption instructions, or any other suitable description), and item options 375 (e.g., item colors, sizes, flavors, etc.).

The database 116 may also store email assessment model data 390 identifying and characterizing one or more models and related data for detecting email manipulation. For example, the email assessment model data 390 may include a syntax check model 392, one or more tumbling check models 394, a gibberish check model 396, a label adjustment model 398, and label data 399.

The syntax check model 392 may be used to perform a syntax check on an email address, e.g. using at least one rule-based logic determined based on an email provider or a domain portion of the email address. For example, some email provider may only support email addresses having letters and/or digits in the username of the email addresses. As such, an email address having a domain of the email provider can be determined by the syntax check model 392 as invalid, if a username of the email address includes a character other than letters and digits. In some examples, the syntax check model 392 outputs a label indicating whether the email address is invalid.

The one or more tumbling check models 394 may be used to perform a tumbling check on an email address to determine whether the email address is one of multiple tumbling emails sharing a similar pattern and associated with a same user. In some embodiments, the one or more tumbling check models 394 include one or more rule based models for determining whether the email address is a tumbling email based on: e.g. a population-based rule related to both the email address and other email addresses, and/or a population-free rule related to the email address alone. In some embodiments, the one or more tumbling check models 394 include a machine learning model (e.g. a deep learning model or a neural network) for determining whether the email address is a tumbling email, based on features derived from the email address. In some examples, the features derived from the email address include numeric features and a gene matrix representing an evolutionary process that leads to the email address. The machine learning model may be trained based on the model training data 358. In some examples, the one or more tumbling check models 394 output a label indicating whether the email address is tumbling.

The gibberish check model 396 may be used to perform a gibberish check on the email address to determine whether the email address is a gibberish email containing gibberish characters. In some embodiments, the gibberish check model 396 includes an n-gram model used to compute a perplexity score for the email address, where a larger perplexity score represents a higher probability that the email address is a gibberish email. In some embodiments, the gibberish check model 396 also includes a padding model to pad input data to the n-gram model, and a smoothing model to avoid calculation error of the perplexity score. In some examples, the gibberish check model 396 outputs a label indicating whether the email address is a gibberish email.

The label adjustment model 398 may be used to adjust labels generated by the syntax check model 392, the one or more tumbling check models 394, and/or the gibberish check model 396. In some embodiments, the label adjustment model 398 includes at least one adjustment rule that is determined based on a clustering logic, a popular username logic, and/or predetermined email domain lists. The at least one adjustment rule can be applied to the labels generated by the other models 392, 394, 396 to confirm or adjust these labels. In some examples, a clustering logic may be used to change an email label from gibberish to non-gibberish, or vice versa. In some examples, a popular username logic may be used to change an email label from tumbling to non-tumbling, to reduce false positive detection rate of the tumbling detection.

The label data 399 may include data of labels generated by the syntax check model 392, the one or more tumbling check models 394, and/or the gibberish check model 396. In some embodiments, the label data 399 may include data of labels adjusted by the label adjustment model 398. In some embodiments, the label data 399 may include data of pseudo-labels generated for training one or more of the syntax check model 392, the one or more tumbling check models 394, the gibberish check model 396, or the label adjustment model 398.

In some examples, the email manipulation computing device 102 receives an email assessment request 310 from the server 104. The email assessment request 310 may be associated with an email address of a user on an e-commerce platform, e.g. a retailer's website or app, hosted by the server 104. In some examples, the email assessment request 310 is to seek an assessment of manipulation risk of the email address. The email manipulation computing device 102 may generate email feature data based on the email address. In some embodiments, the email manipulation computing device 102 may obtain the email feature data from the server 104 and/or the database 116. Based on the email feature data, the email manipulation computing device 102 may compute, using at least one machine learning model, manipulation indication data 312 of the email address. The at least one machine learning model may include any model in the email assessment model data 390. In response to the email assessment request 310, the email manipulation computing device 102 transmits the manipulation indication data 312 of the email address to the server 104. In some examples, the email manipulation computing device 102 receives an email assessment request for a corresponding email address from the store 109, then generates and transmits manipulation indication data of the corresponding email address to the store 109. In some embodiments, the email manipulation computing device 102 may assign one or more of the above described operations to a different processing unit or virtual machine hosted by one or more processing devices 120.

Figure 4:
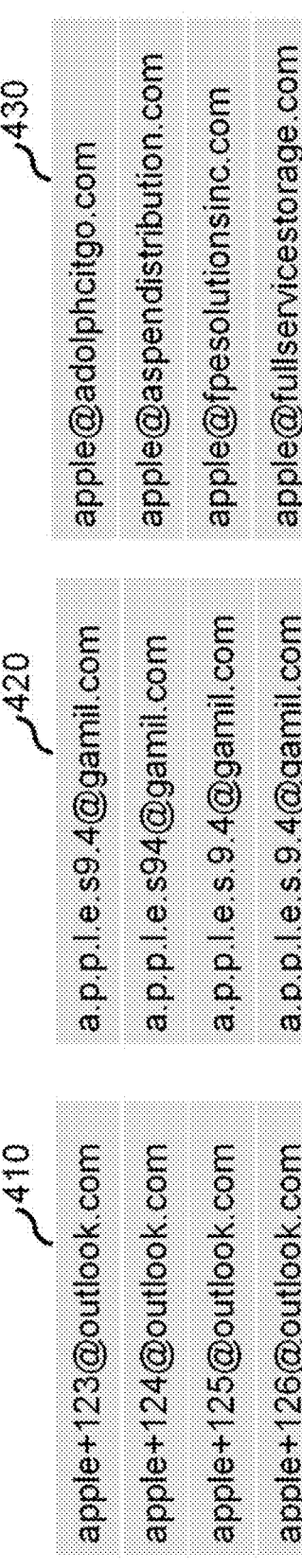
FIG. 4 illustrates exemplary groups of tumbling emails, in accordance with some embodiments of the present teaching.

FIG. 4 illustrates exemplary groups of tumbling emails, in accordance with some embodiments of the present teaching. As shown in FIG. 4, a same user may create different emails sharing a similar pattern. For example, every email in a first group 410 starts with "apple" which is followed by "+" and some digits. In another example, all emails in a second group 420 include the characters "apples94" with period marks inserted at different locations. In yet another example, all emails in a third group 430 have the same username "apple" but different domain names. A fraudster may register or sign up different accounts using the similar emails falling into a same group, with intent to perform fraudulent transactions or other frauds. In that case, any email in that same group is called a tumbling email. The tumbling check performed by the disclosed system aims to detect all of these tumbling emails.

Figure 5:
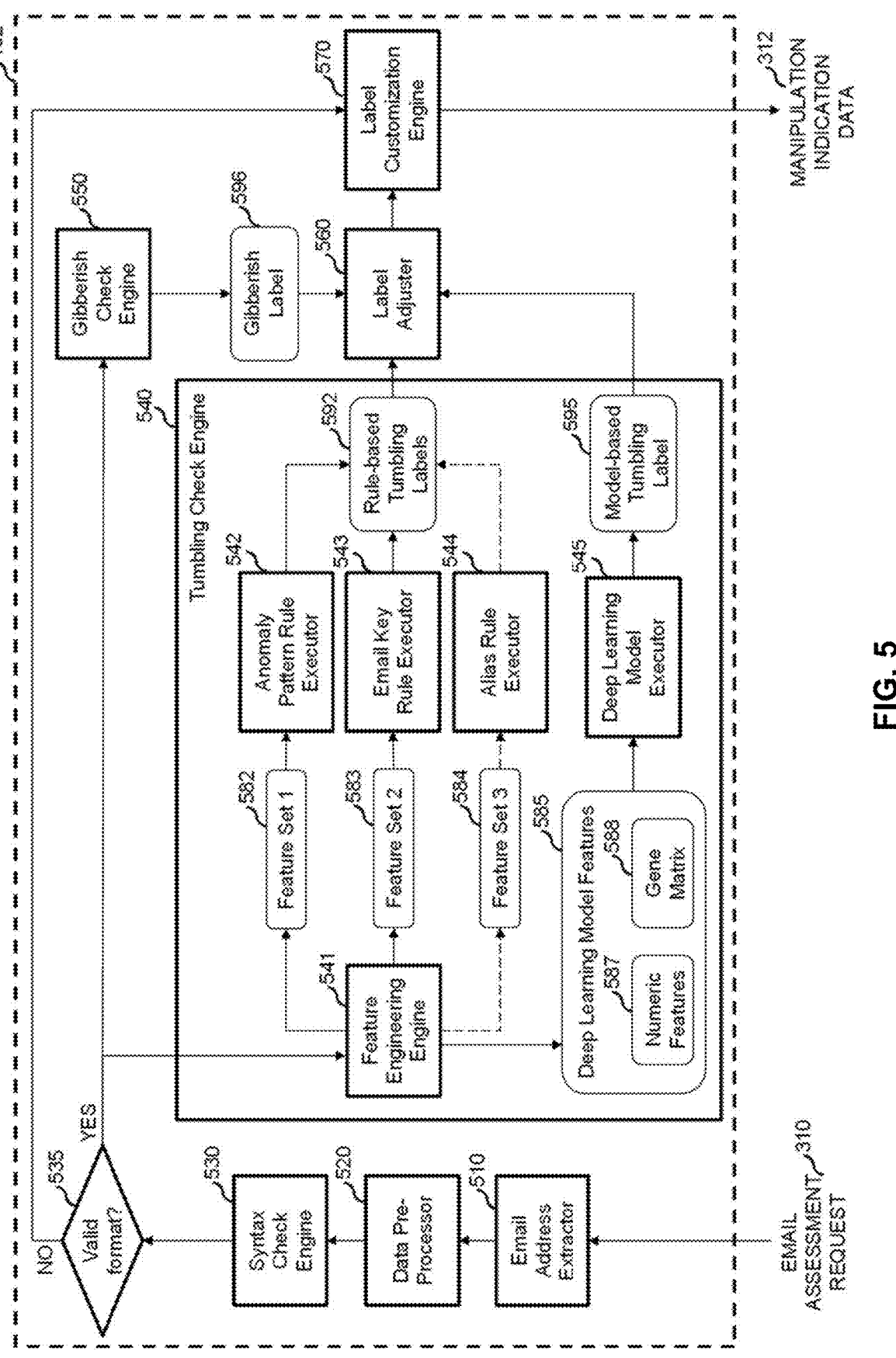
FIG. 5 illustrates a detailed diagram of an email manipulation computing device for computing manipulation indication data, in accordance with some embodiments of the present teaching.

FIG. 5 illustrates a detailed diagram of an email manipulation computing device, e.g. the email manipulation computing device 102 in FIG. 1 and/or FIG. 3, for computing manipulation indication data. In the example shown in FIG. 5, the email manipulation computing device 102 includes: an email address extractor 510, a data pre-processor 520, a syntax check engine 530, a tumbling check engine 540, a gibberish check engine 550, a label adjuster 560 and a label customization engine 570.

In some embodiments, the email feature data generator 410 receives an email assessment request regarding an email address, which may be the email assessment request 310 as shown in FIG. 3. The email address extractor 510 can extract the email address from the email assessment request 310. In some embodiments, the email address extractor 510 extracts the email address from a database, e.g. the database 116, based on the email assessment request 310. In some embodiments, the email address itself is the only input data needed by the email manipulation computing device 102 to compute the manipulation indication data 312 in real-time. The email address extractor 510 may forward the email address to the data pre-processor 520 for processing.

In some embodiments, the data pre-processor 520 performs some data pre-processing on the email address. In some examples, the data pre-processor 520 can change all upper case letters in the email address to lower case letters. In some examples, the data pre-processor 520 can remove space character(s) located at the end and/or the beginning of the email address.

In some embodiments, the syntax check engine 530 performs a syntax check, which may be a format check, for the email address. For example, the format requirements of usernames and domains for different email providers can be searched, determined, and stored in a database, e.g. the database 116, in real-time or before receiving the email assessment request 310. The syntax check engine 530 can build a model based on some rules and logics, e.g. the syntax check model 392, to check whether the email address has an invalid format or not. For example, the syntax check engine 530 can parse the email address to determine the domain portion (after the last character @) of the email address, and determine an email provider associated with that domain portion. Using rules and logics based on format requirements from the email provider, the syntax check engine 530 can determine whether (the username of) the email address has a valid or invalid format.

In another example, the syntax check engine 530 can check the format for the domain portion in the email address, e.g. based on a letter-digit-hyphen (LDH) rule. If the syntax check engine 530 determines that the domain portion is not associated with any email provider, the syntax check engine 530 can determine accordingly that the email address has an invalid format.

In some examples, the syntax check engine 530 can perform the syntax check on the email address based on rules and logics developed by a retailer or business requesting the email assessment request 310. These rules and logics may be pre-developed based on many historical email assessment data or manipulation check results.

As shown in FIG. 5, the syntax check engine 530 determines at operation 535 that whether the email address has a valid format. If so, the process goes in parallel to the tumbling check engine 540 for tumbling check, and to the gibberish check engine 550 for gibberish check. If not, the process may go directly to the label customization engine 570 for generating manipulation label data or manipulation indication data.

In some embodiments, the tumbling check engine 540 performs a tumbling check on the email address to determine whether the email address is one of multiple tumbling emails associated with the user. As shown in FIG. 5, the tumbling check engine 540 in this example includes a feature engineering engine 541, an anomaly pattern rule executor 542, an email key rule executor 543, an alias rule executor 544, and a deep learning model executor 545.

The feature engineering engine 541 in this example can generate a plurality of feature sets based on the email address, e.g. using natural language processing. As shown in FIG. 5, the feature engineering engine 541 can generate a feature set 1 582 to be fed into the anomaly pattern rule executor 542, a feature set 2 583 to be fed into the email key rule executor 543, and optionally a feature set 3 584 to be fed into the alias rule executor 544.

In some embodiments, the feature set 1 582 includes numeric features like: maximum length of repeated character, length of pattern, length of longest number, length of continuous substring, length of the longest repeated substring, number of substrings, etc. of the email address. In some embodiments, the feature set 1 582 also includes features related to one or more anomaly pattern rules to be executed by the anomaly pattern rule executor 542, e.g. quantiles of a distribution to be used to get the thresholds for risk tiers by the anomaly pattern rule executor 542. In some embodiments, the feature set 1 582 also includes features related to email matching, e.g. a matching between a contact email and a billing/payment email of the same user. For example, the feature set 1 582 may include features to detect tumbling emails associated with an account or a transaction, features about the full email, a string similarity score, and email keys that were used to build the anomaly pattern rules. In some embodiments, the feature set 1 582 also includes a similarity score computed to represent a similarity between the email address extracted by the email address extractor 510 and another email address. For example, a user may have a contact email in the account, and may also have a billing email associated with a payment method. The similarity score may be computed based on a normalized distance between the two strings of the two emails.

The anomaly pattern rule executor 542 in this example can execute one or more anomaly pattern rules to determine whether the email address is tumbling, based on the features in the feature set 1 582. For example, the anomaly pattern rule executor 542 may use some anomaly pattern rule to check whether this email has a quantity of punctuation marks more than a threshold. In another example, the anomaly pattern rule executor 542 may use some anomaly pattern rule to check whether the length of the username is longer than a threshold. In yet another example, the anomaly pattern rule executor 542 may use some anomaly pattern rule to check whether an average of lengths of the substrings in the username is shorter than a threshold. As such, the anomaly pattern rule executor 542 may execute a plurality of anomaly pattern rules, each based on a corresponding feature and a corresponding threshold. In some embodiments, each corresponding feature has a corresponding distribution of the feature across many emails; and the corresponding threshold is determined based on a quantile analysis on the corresponding distribution. In some embodiments, the anomaly pattern rule executor 542 generates one or more of the rule-based tumbling labels 592, where each label indicates whether the email address is a tumbling email based on a corresponding anomaly pattern rule.

In some embodiments, the feature set 2 583 includes features (e.g. email keys) related to one or more email key rules to be executed by the email key rule executor 543. A first exemplary email key is obtained by removing non-letter characters in the username of the email address, e.g. from apple_a0_123+001@outlook.com to applea@outlook.com. A second exemplary email key is obtained by removing non-letter characters in the username and remove the entire domain of the email address, e.g. from applea@outlook.com to applea. A third exemplary email key is obtained by keeping the longest substring of letters in the username, e.g. from applea to apple.

The email key rule executor 543 in this example can execute one or more email key rules to determine whether the email address is tumbling, based on the email key features in the feature set 2 583. For example, based on an email key, the email key rule executor 543 may count the number of emails sharing the same email key and with consecutive numbers, e.g. apple1, apple2, apple3. In some embodiments, a threshold may be compared to the number to determine whether the email address is tumbling. In some embodiments, the threshold may be determined a quantile analysis on a distribution of the email key features. In some embodiments, data tables (standalone or as part of the database 116) can be built to store suspicious email keys in historical data. In some embodiments, the email key rule executor 543 generates one or more of the rule-based tumbling labels 592, where each label indicates whether the email address is a tumbling email based on a corresponding email key rule.

In some embodiments, the feature set 3 584 includes features related to one or more alias rules to be executed by the email key rule executor 543. An alias is a sub-email address, supported by some email providers, based on a basic email address. For example, based on the basic email address apple@gmail.com, the same user can create aliases or sub-email addresses like apple+1@gmail.com, apple+2@gmail.com, apple+kid@gmail.com, etc. Typically, an alias or sub-email address can be used to receive emails, but cannot be used to send emails.

The alias rule executor 544 in this example can execute one or more alias rules to determine whether the email address is tumbling, based on the alias related features in the feature set 3 584. For example, based on an alias rule, the alias rule executor 544 may count the number of alias sub-email addresses registered with the system by the same user. In some embodiments, a threshold may be compared to the number to determine whether the email address is tumbling. In some embodiments, the threshold may be determined a quantile analysis on a distribution of the alias related features. In some embodiments, if the alias rule executor 544 determines that the email address is an alias or sub-email address, a label will be generated to indicate that the email address is an alias. In some embodiments, the alias rule executor 544 generates one or more of the rule-based tumbling labels 592, where each label indicates whether the email address is a tumbling email based on a corresponding alias rule.

In some embodiments, the feature engineering engine 541 can directly determine whether the email address extracted by the email address extractor 510 is an alias or not. In that case, the feature set 3 584 will only be generated and the alias rule executor 544 will only be triggered if the feature engineering engine 541 determines that the email address extracted by the email address extractor 510 is an alias.

As such, a plurality of rules are applied on the plurality of feature sets 582, 583, 584 to generate one or more rule-based tumbling labels 592 indicating whether the email address is a tumbling email. In some embodiments, each of the anomaly pattern rule executor 542, the email key rule executor 543 and the alias rule executor 544 computes a respective tumbling score based on a respective threshold, which is pre-determined based on a quantile analysis on a feature distribution associated with emails of historical and current users. The rule-based tumbling label 592 is generated based on all tumbling scores computed by applying the plurality of rules.

In some embodiments, the anomaly pattern rules applied by the anomaly pattern rule executor 542 are called population-free rules, as they are related to the email address alone. In some embodiments, the email key rules applied by the email key rule executor 543 and the alias rules applied by the alias rule executor 544 are called population-based rules, as they are related to both the email address and other email addresses.

In some embodiments, the feature engineering engine 541 can also generate deep learning model features 585 to be input to a deep learning model by the deep learning model executor 545. In some embodiments, the deep learning model features 585 include numeric features 587 and gene matrix 588 associated with the email address extracted by the email address extractor 510. The numeric features 587 may include features like: length of username, length of shortest substring, count of punctuations, count of substrings, etc. of the email address. The gene matrix 588 is a matrix transformed from the email address to represent an evolutionary process that leads to the email address. In some embodiments, the gene matrix 588 is generated based on an image visualization showing patterns and clusters of historical tumbling emails.

Figure 6:
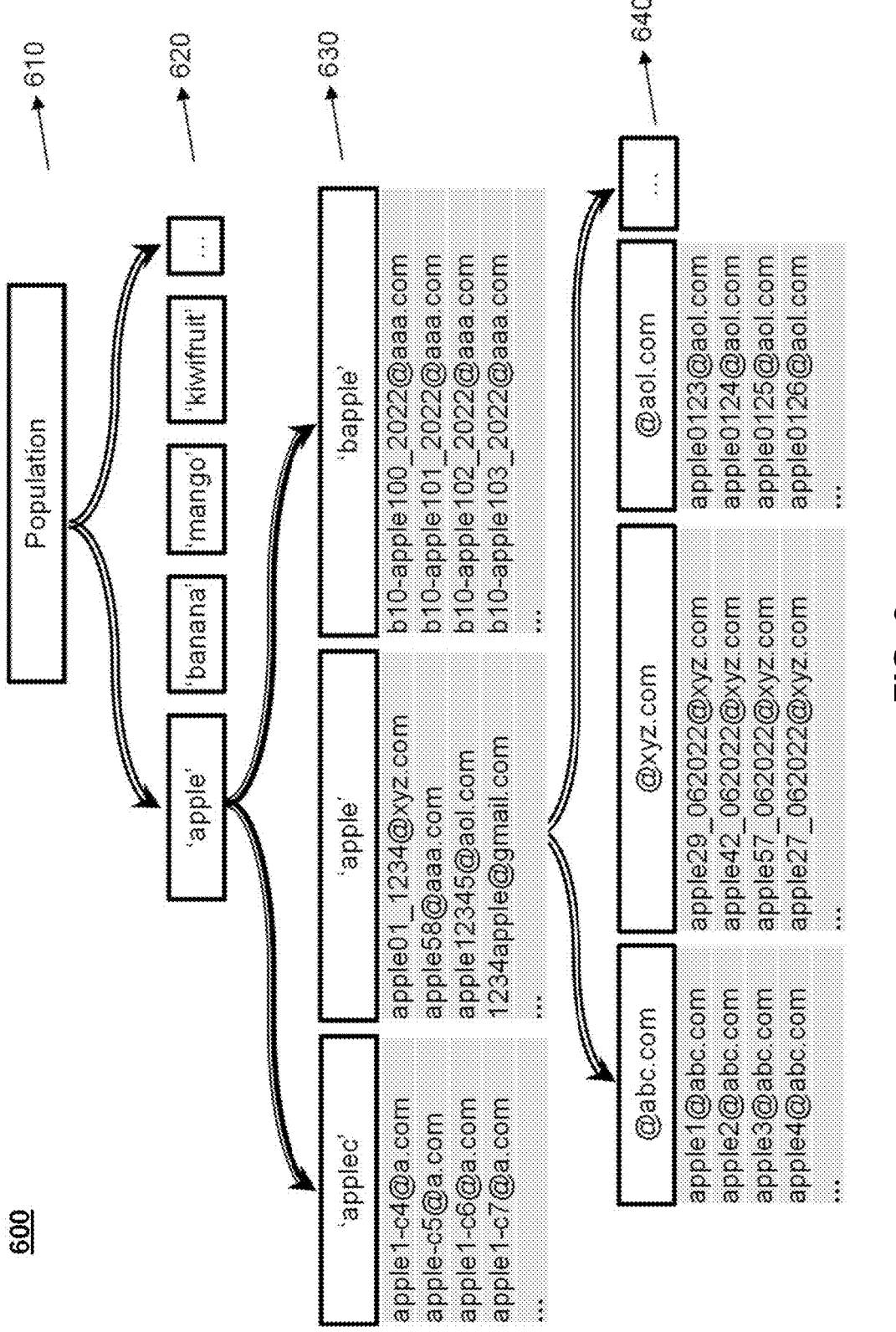
FIG. 6 illustrates an exemplary evolutionary process that leads to tumbling emails, in accordance with some embodiments of the present teaching.

FIG. 6 illustrates an exemplary evolutionary process that leads to tumbling emails, in accordance with some embodiments of the present teaching. As shown in FIG. 6, all possible email addresses can be organized in a multi-layer structure 600. The top layer 610 of the multi-layer structure 600 in this example includes the entire email population, or entire tumbling email population generated based on the rule-based models executed by the anomaly pattern rule executor 542, the email key rule executor 543 and the alias rule executor 544. The second layer 620 from top in this example includes keywords extracted from the entire email population. For example, the second layer 620 may include keywords like: "apple," "banana," "mango," "kiwifruit," etc. The third layer 630 from top in this example includes variants of each keyword in the second layer 620. For example, for the keyword "apple" in the second layer 620, the third layer 630 includes variants "applec," "apple," "bapple." Each of these variants can be used to generate multiple email addresses. The fourth layer 640 from top in this example includes, for each variant in the third layer 630, emails derived from the variant based on different email domains. For example, for the variant "apple" in the third layer 630, the fourth layer 640 includes emails generated based on "apple" and some digits, in different email domains, like: apple1@abc.com, apple0124@aol.com, apple42_062022@xyz.com, etc.

As shown in FIG. 6, if a user creates multiple emails within a same group in the fourth layer 640 under a same email domain, these emails can be treated as tumbling emails. As such, the process 600 of generating an email in the fourth layer 640 from top layer down, can be considered or estimated as an evolutionary process which is used by a fraudster to generate this tumbling email. This evolutionary process illustrates a tumbling history and pattern of the tumbling email, and is very useful for clustering and detecting tumbling emails.

Figure 7:
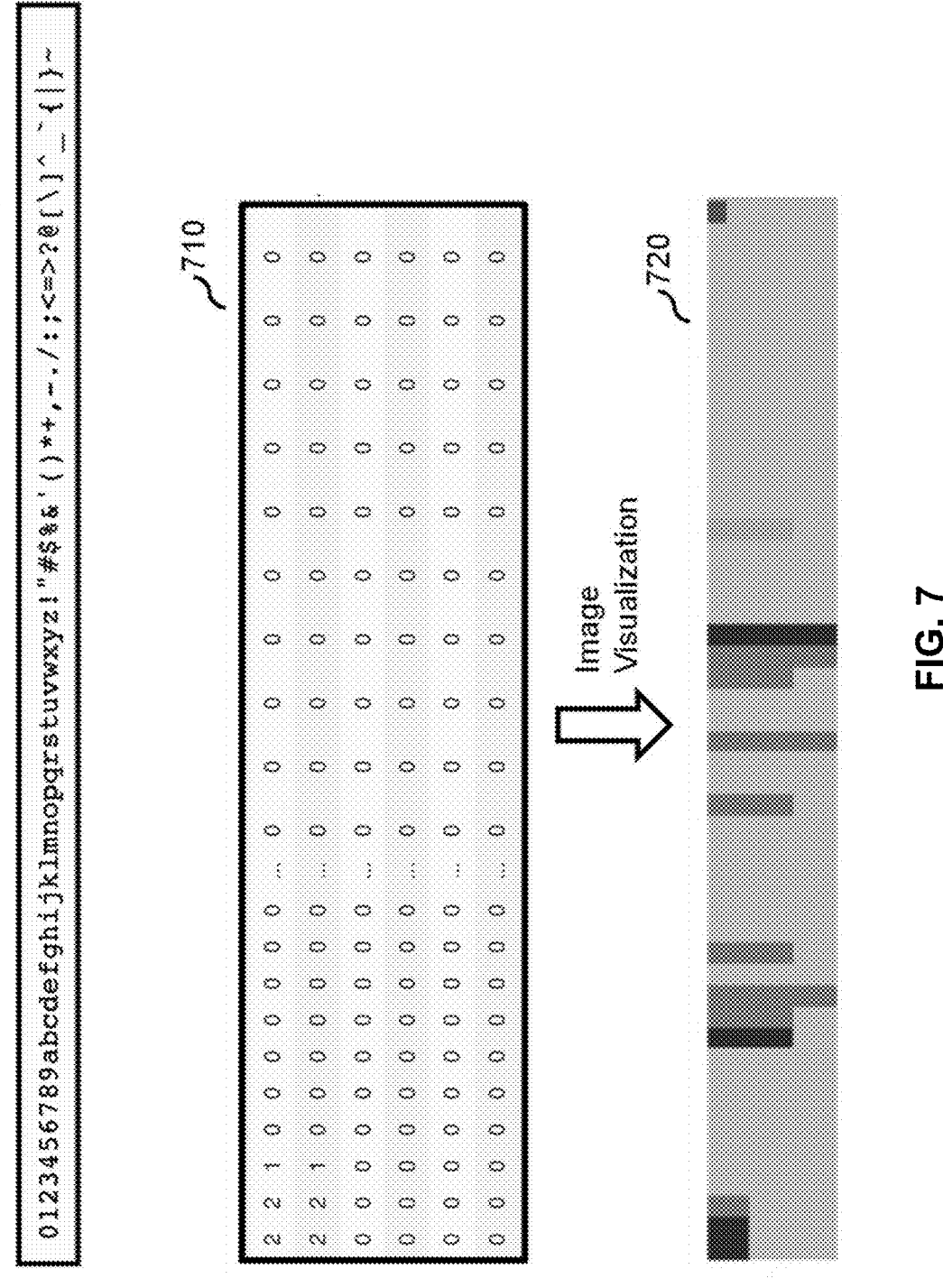
FIG. 7 illustrates an exemplary gene matrix for an email address, in accordance with some embodiments of the present teaching.

FIG. 7 illustrates an exemplary gene matrix 710 for an email address, in accordance with some embodiments of the present teaching. The gene matrix 710 is generated by considering tumbling as an evolutionary process in which gene sequence is the same as string data. Transformation tools can be built to extract the gene matrix 710 from an email address with evolutionary information, based on an email gene dictionary 702. The email gene dictionary 702 includes all possible characters in an email address.

In some examples, the gene matrix 710 in FIG. 7 is generated based on an email address: apple_10.1a.ry.ye.bay_02@gmail.com. In some embodiments, the first row of the gene matrix 710 corresponds to the entire original email address, where different columns represent different characters in the email gene dictionary 702, respectively, and each element in the first row is a number representing a count of characters for the respective column in the original email. For example, the first element in the first row is 2 because there are two 0's in the original email address; the second element in the first row is 2 because there are two 1's in the original email address; the third element in the first row is 1 because there is one 2 in the original email address; the fourth element in the first row is 0 because there is no 3 in the original email address; so on and so forth.

The second row of the gene matrix 710 corresponds to a second layer email address derived from the original email address, where different columns represent different characters in the email gene dictionary 702, respectively, and each element in the second row is a number representing a count of characters for the respective column in the second layer email. In this example, the second layer email address is generated by removing special characters from the original email address, i.e. leaving only letters and digits, to arrive at apple101aryyebay02@gmail.com.

The third row of the gene matrix 710 corresponds to a third layer email address derived from the second layer email address, where different columns represent different characters in the email gene dictionary 702, respectively, and each element in the third row is a number representing a count of characters for the respective column in the third layer email. In this example, the third layer email address is generated by removing digits from the second layer email address, i.e. leaving only letters, to arrive at applearyyebay@gmail.com.

Then the fourth row and other rows of the gene matrix 710 can be generated similarly by further deriving the email address, e.g. by extracting sub-strings, by extracting meaningful sub-strings, by extracting longest sub-strings, etc. This process will go on to find the oldest ancestor for the original email address at the last or bottom row of the gene matrix 710. Then the reverse process from the oldest ancestor to the original email address can be considered as an evolutionary process for generating the original email address, potentially by a fraudster as a tumbling email.

Figure 8:
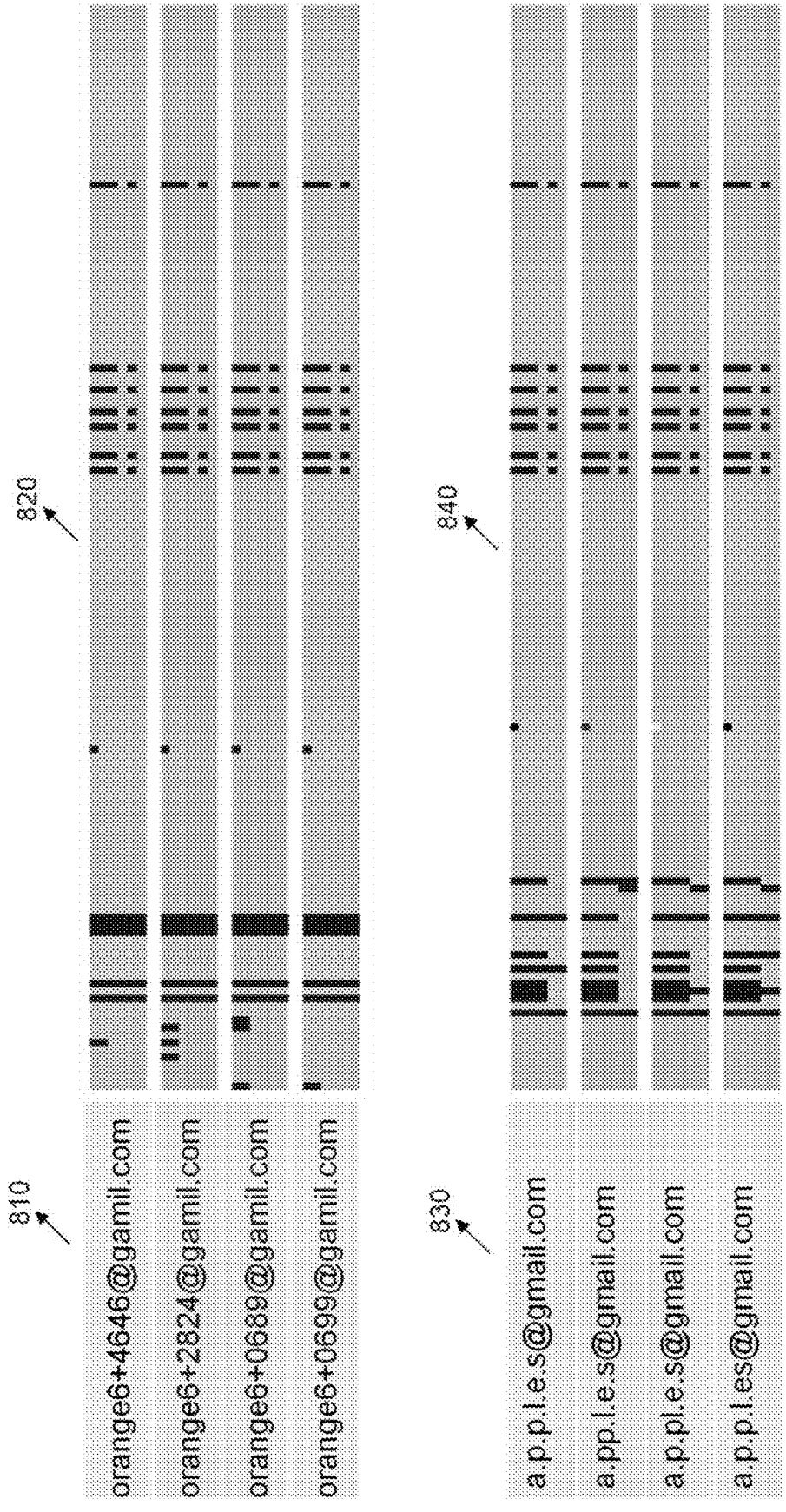
FIG. 8 illustrates image visualization of gene matrices for tumbling emails, in accordance with some embodiments of the present teaching.

In some embodiments, the gene matrix 710 can be visualized by an image visualization 720. FIG. 8 illustrates image visualization of gene matrices for exemplary tumbling emails, in accordance with some embodiments of the present teaching.

As shown in FIG. 8, a first group 810 of tumbling emails are similar to each other, as they have the same domain, and all start with "orange6+," which is then followed by different combinations of four digits of numbers. Their similarity (and dissimilarity) can be illustrated and visualized in the corresponding image visualization 820.

Accordingly, a second group 830 of tumbling emails are similar to each other, as they have the same domain, and all include the basic string "apples," which is cut by different combinations of period marks. Their similarity (and dissimilarity) can be illustrated and visualized in the corresponding image visualization 840.

The gene matrices can be used to implement deep learning models to learn the evolutionary process and tumbling patterns used by fraudsters, which are then used to detect tumbling emails. Referring back to FIG. 5, the numeric features 587 and the gene matrix 588 can be input to a deep learning model by the deep learning model executor 545 to generate a model-based tumbling label 595 indicating whether the email address is a tumbling email.

Figure 9:
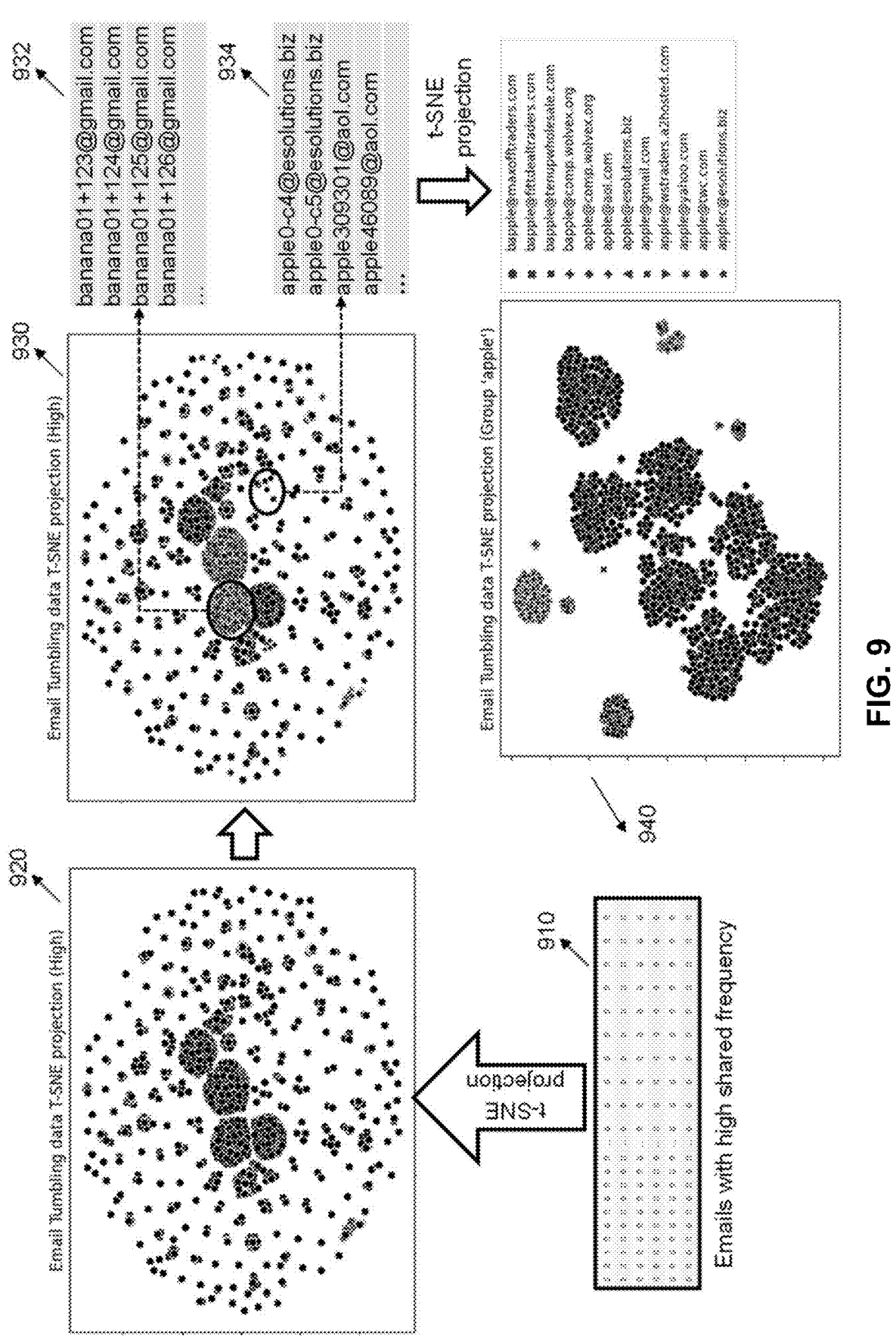
FIG. 9 illustrates clustering and visualization for tumbling emails, in accordance with some embodiments of the present teaching.

In some embodiments, the performance of the deep learning model can be monitored by clustering and visualization. FIG. 9 illustrates clustering and visualization for tumbling emails, in accordance with some embodiments of the present teaching.

In some examples, gene matrices 910 generated from emails with high shared frequency may have a dimension over 700. To find out whether there are some significant clusters or groups of tumbling emails, the system can transform the high dimensional data to two dimensions, e.g. using t-distributed stochastic neighbor embedding (t-SNE) projection, to generate a two-dimensional plot 920.

In this example, one can observe that there are some large clusters. When one of these large clusters is highlighted (in the two-dimensional plot 930 same as the two-dimensional plot 920) to find corresponding original emails, the system can determine that this group of emails 932 or 934 are clustered into the large cluster because they share the same or almost the same string in their usernames.

To deep dive to learn the evolutionary process of these emails, the system can perform another t-SNE projection from the group of emails 934, to find that this group of emails can be divided into more details of sub groups, as shown in the two-dimensional plot 940. This clustering visualization is very helpful to ensure the data transformation from email address to gene matrix works and will help to cluster the similar emails and distinguish more details of the similar emails even though they belong to the same ancestor. In some embodiments, the evolutionary process shown in FIG. 6 can be generated from a plot similar to the two-dimensional plot 940.

Referring back to FIG. 5, the deep learning model executed by the deep learning model executor 545 can be trained based on some training data, e.g. the model training data 358 in the database 116. In some embodiments, the deep learning model is trained based on: obtaining a plurality of emails associated with a plurality of users; automatically generating, for each respective email address of the plurality of emails, a pseudo-label indicating whether the respective email address is tumbling or not; performing a label adjustment on the generated pseudo-labels based on feedbacks from business unit, customer service and/or expert review to generate training labels; generating gene matrices and numeric features for the plurality of emails, to form labelled training data with training labels; and training the deep learning model based on the labelled training data.

Figure 10:
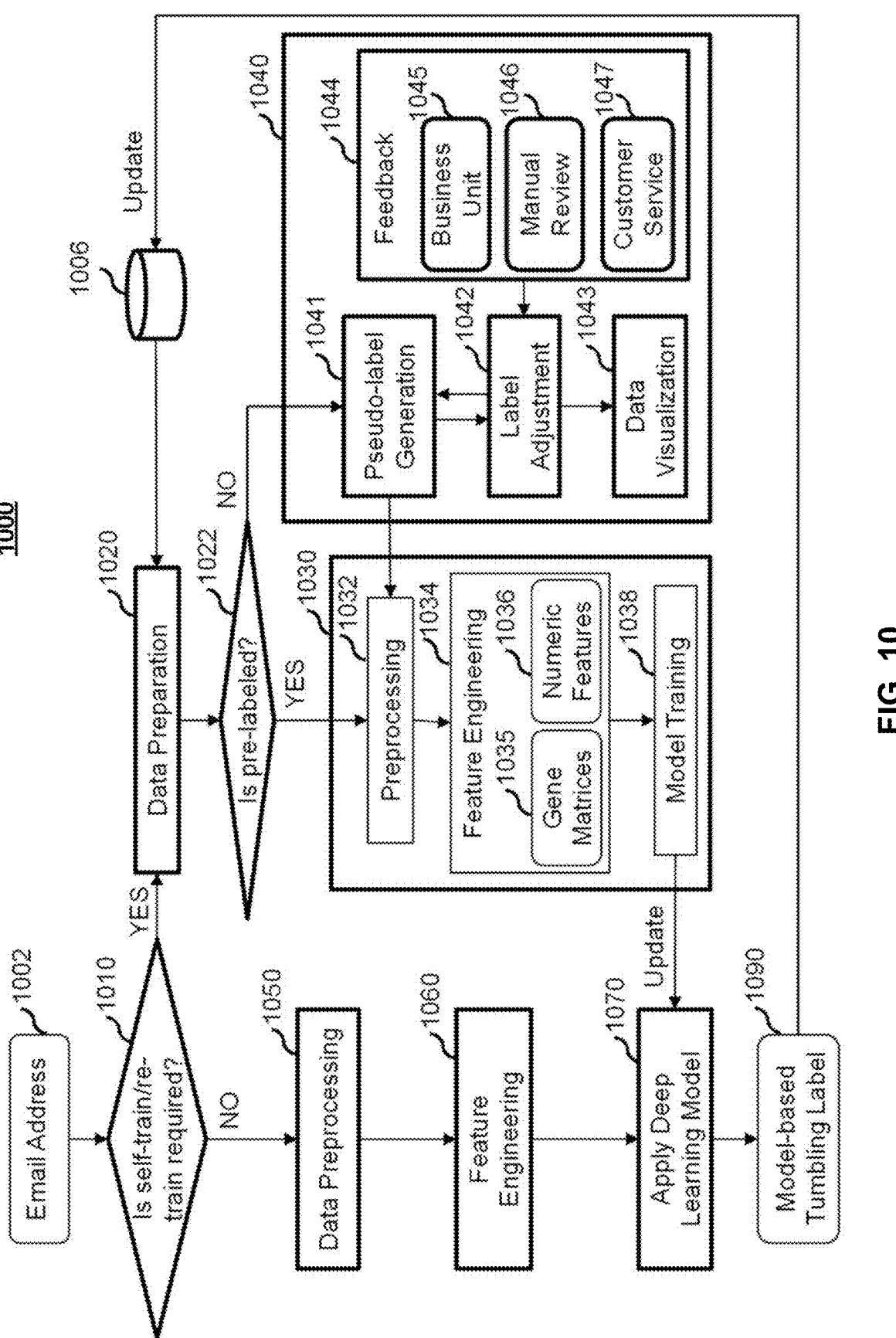
FIG. 10 illustrates a process for applying and training a deep learning model for detecting tumbling emails, in accordance with some embodiments of the present teaching.

FIG. 10 illustrates a process 1000 for applying and training a deep learning model for detecting tumbling emails, e.g. the deep learning model executed by the deep learning model executor 545 in FIG. 5, in accordance with some embodiments of the present teaching. In some embodiments, the process 1000 can be carried out by one or more computing devices, such as the email manipulation computing device 102 and/or the cloud-based engine 121 of FIG. 1. For example, the process 1000 can be performed by the email manipulation computing device 102 periodically (e.g. daily, weekly, or monthly), or upon an event or request.

As shown in FIG. 10, the process 1000 starts from operation 1010, where an email address 1002 is received and it is determined whether the deep learning model requires a self-train or re-train. If it is determined at the operation 1010 that a training or re-training is needed, the process goes to operation 1020 for data preparation. Otherwise, if it is determined at the operation 1010 that a training or re-training is not needed, the process goes to operation 1050 for data preprocessing.

At the operation 1050, data preprocessing is performed on the email address 1002. For example, the data preprocessing may include changing all upper case letters in the email address 1002 to lower case letters, and/or removing any space character located at the end and/or the beginning of the email address 1002. Then at operation 1060, feature engineering is performed on the email address 1002 to generate features like numeric features and a gene matrix, which are fed into a deep learning model at operation 1070. The deep learning model at operation 1070 may be an updated model after a training or re-training process. A model-based tumbling label 1090 is output from the deep learning model at the operation 1070, to indicate whether the email address 1002 is a tumbling email or not. In some embodiments, the model-based tumbling label 1090 is used to update a database 1006 for generating future training data for future training of the deep learning model.

At the operation 1020, training data is prepared from the database 1006, which can be a standalone database or part of the database 116. Then at operation 1022, it is determined whether the training data is pre-labelled. If so, the process goes to operation 1030 for training the model. If not, the process goes to operation 1040 for generating labels for the training data.

In the example shown in FIG. 10, the operation 1040 includes sub-operations 1041, 1042, 1043. At the sub-operation 1041, a pseudo-label generation is performed to generate pseudo labels for the training data. Each pseudo label indicates whether a respective email address in the training data is tumbling or not. In some embodiments, the pseudo labels can be generated automatically based on some rule based logics, e.g. based on one or more of the rules executed by the anomaly pattern rule executor 542, the email key rule executor 543, and the alias rule executor 544.

Then at the sub-operation 1042, a label adjustment is performed to confirm or adjust the generated pseudo labels. In some embodiments, the label adjustment may be performed based on feedbacks 1044 from business unit 1045, manual review 1046, and/or customer service 1047.

At the sub-operation 1043, data visualization is performed to monitor or double check whether there are large groups of false positive tumbling emails associated with non-fraudsters labelled by the sub-operations 1041, 1042, e.g. using a clustering visualization as shown in FIG. 9. In some embodiments, the system performs the sub-operations 1041, 1042 and/or 1043 multiple times back and forth to exclude some false positive cases and good users from the tumbling labels. The generated and adjusted pseudo labels can be sent to the operation 1030 for training the deep learning model.

In the example shown in FIG. 10, the operation 1030 includes sub-operations 1032, 1034, 1038. At the sub-operation 1032, the training data is pre-processed with the pseudo labels generated and adjusted by the operation 1040. For example, each email address in the training data may be attached with a corresponding pseudo label in a consistent manner at the sub-operation 1032, to generate labelled training data.

At the sub-operation 1034, feature engineering is performed on the labelled training data to generate gene matrices 1035 and numeric features 1036 from the email addresses in the labelled training data. Each gene matrix of the gene matrices 1035 is generated from a corresponding email address in the labelled training data, using methods disclosed above. The numeric features 1036 may include features like: length of username, length of shortest substring, count of punctuations, count of substrings, etc. of each email address in the labelled training data.

Figure 11:
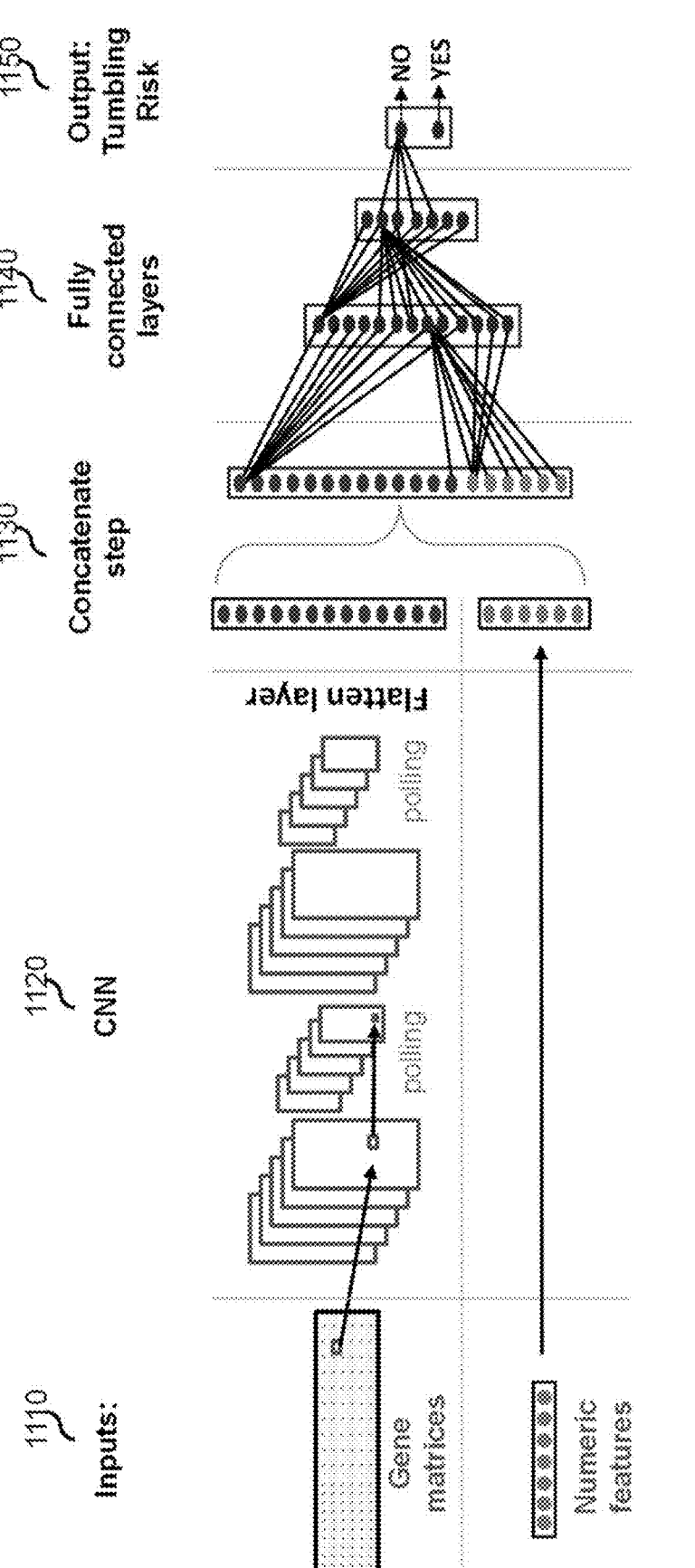
FIG. 11 illustrates an architecture of an exemplary deep learning model for detecting tumbling emails, in accordance with some embodiments of the present teaching.

Then at the sub-operation 1038, the deep learning model is trained based on the gene matrices 1035 and the numeric features 1036. FIG. 11 illustrates an architecture of an exemplary deep learning model for detecting tumbling emails, in accordance with some embodiments of the present teaching. As shown in FIG. 11, the input data 1110 to the deep learning model include: gene matrices and numeric features. During a training stage of the deep learning model, the input data 1110 may include the gene matrices 1035 and the numeric features 1036.

The deep learning model in the example shown in FIG. 11 includes a convolutional neural network (CNN) 1120. During the training stage, the CNN 1120 is trained based on the gene matrices with corresponding tumbling labels. In some embodiments, the output vectors of the CNN 1120 is concatenated with vectors representing the numeric features, to generate input vectors to fully connected layers 1140, which are trained based on the input vectors to generate output data 1150. In the example shown in FIG. 11, the output data 1150 includes a tumbling label indicating whether an email address has tumbling risk or not. In some embodiments, the hyperparameters in the deep learning model are optimized during training to minimize a total difference between the tumbling labels output by the deep learning model and the tumbling labels in the labelled training data for corresponding emails generating the input data 1110. In some embodiments, the number of convolution layers in the CNN 1120 and the number of fully connected layers 1140 are also optimized during training to minimize the total difference between the tumbling labels output by the deep learning model and the tumbling labels in the labelled training data for corresponding emails generating the input data 1110.

Referring back to FIG. 10, after the deep learning model is trained or re-trained at the sub-operation 1038. The trained or re-trained deep learning model will be used at the operation 1070 to generate the model-based tumbling label 1090, as discussed above.

As such, the process 1000 in FIG. 10 can be performed to meet different business requirements. In one example, a business entity does not need to train the deep learning model, and wants to use a pre-trained model. In that case, the process 1000 will go directly from the operation 1010 to the operation 1050, without the model training or label generation operations in FIG. 10.

In another example, a business entity has its own email data and own generated labels, and wants to re-train the deep learning model. In that case, the process 1000 will go through the operation 1030 to re-train the deep learning model based on its own email data and own labels, and use the re-trained and updated deep learning model to predict tumbling risks for new emails.

In yet another example, a business entity has its own email data but does not have labels for the email data. In that case, the process 1000 will first go through the operation 1040 to generate pseudo labels for the email data, and then go through the operation 1030 to re-train the deep learning model based on its own email data and the pseudo labels. The re-trained and updated deep learning model will be used to predict tumbling risks for new emails.

Referring back to FIG. 5, the model-based tumbling label 595 may be generated by the deep learning model executor 545 like generating the model-based tumbling label 1090 in FIG. 10. As such, there are at least two types of tumbling labels: the rule-based tumbling labels 592 and the model-based tumbling label 595. In some embodiments, the email address extracted by the email address extractor 510 is determined as a tumbling email or not, based on a combination of the rule-based tumbling labels 592 and the model-based tumbling label 595. In some embodiments, the email address extracted by the email address extractor 510 is determined as a tumbling email, in accordance with a determination that at least one of the rule-based tumbling labels 592 or the model-based tumbling label 595 indicates the email address is a tumbling email. In the example shown in FIG. 5, all of the rule-based tumbling labels 592 and the model-based tumbling label 595 are provided to the label adjuster 560 for label adjustment.

In some embodiments, the gibberish check engine 550 in FIG. 5 performs a gibberish check on the email address to determine whether the email address is a gibberish email containing gibberish characters. In some embodiments, the gibberish check is performed based on: determining a vocabulary based on letters, digits and special characters; extracting a username string from the email address; processing the username string to generate a processed username; computing, using a machine learning model, a perplexity score for the processed username based on padding, smoothing, and the vocabulary, wherein the perplexity score indicates a probability that the email address is gibberish; and generating a gibberish label indicating whether the email address is a gibberish email based on the perplexity score.

In some examples, the gibberish check is performed on an email username (e.g. "ewsi7xzqasba") using an n-gram model (e.g. 4-gram model), based on an email pool including millions of emails associated with users of a retailer. The vocabulary includes letters, digits, and some special characters, e.g. as the email gene dictionary 702 in FIG. 7. The vocabulary is updated or another vocabulary is built to include rare or unknown characters from the email pool. Some pre-processing may be performed to convert all letters to lower case. Data padding can be performed, at the beginning or at the end of a sub-string of the email username, to form input data for the n-gram model.

In one example, the perplexity score for a username (w) is computed as:

$$\text{Perplexity}(w) = \sqrt[n]{\frac{1}{P(w_1 w_2 \ \dots \ w_n)}} = 2^{-\frac{1}{n}\log P(w_1 w_2 \dots w_n)},$$

where $w_1$, $w_2$ . . . $w_n$ are characters in the username w, and the probability $P(w_1 w_2 \ . . . \ w_n)$ is computed as:

$$P(w_1 w_2 \ \dots \ w_n) = \prod_{i=4}^{n} P(w_i \mid w_{i-3} w_{i-2} w_{i-1}),$$

where $P(w_i | w_{i-3} w_{i-2} w_{i-1})$ is computed based on a 4-gram model as:

$$P(w_i \mid w_{i-3} w_{i-2} w_{i-1}) = \frac{C(w_{i-3} w_{i-2} w_{i-1} w_i) + k}{C(w_{i-3} w_{i-2} w_{i-1}) + kV},$$

where C( ) represents a count of appearances of a corresponding string in the email pool and/or a dictionary in natural language, k is a smoothing number added to avoid an error formula divided by zero, and V represents a size of the vocabulary.

In some embodiments, hyperparameters (including k) of the n-gram model are tuned and optimized during a training stage of the n-gram model. A higher the perplexity score means it is more rare for the string combination in the username to happen, which means it is more likely for the username and the email address to be gibberish or randomly typed.

In some embodiments, the gibberish check engine 550 generates a gibberish label 596 indicating whether the email address is a gibberish email based on the perplexity score, and sends the gibberish label 596 to the label adjuster 560 for label adjustment.

The label adjuster 560 in this example performs a label adjustment based on results of the tumbling check and the gibberish check, i.e. based on the rule-based tumbling labels 592, the model-based tumbling label 595 and the gibberish label 596. In some embodiments, the label adjustment is performed based on: obtaining at least one adjustment rule that is determined based on a clustering logic, a popular username logic, and/or predetermined email domain lists; applying the at least one adjustment rule to the result of the tumbling check to confirm or adjust a label indicating whether the email address is a tumbling email; and applying the at least one adjustment rule to the result of the gibberish check to confirm or adjust a label indicating whether the email address is a gibberish email.

Purposes of doing label adjustment include: reducing false positive cases and taking care of special email domains. These can be done by: enhancing the clustering logics, controlling the length of email keys, enabling a two-step clustering and labeling, and/or generating risk tiers with different priorities. In some examples, the adjustment rules built and utilized by the label adjuster 560 may include: rules based on a rare list and a white list for email domains, rules filtering out usernames with popular first and/or last names, rules related to customized blocklists and/or whitelists, etc. For example, a label for an email address in a whitelist will be adjusted to be non-manipulated, even if the email address did not pass the tumbling check or the gibberish check. For example, a label for an email address having a rare domain in the rare list will be adjusted to be manipulated, even if the username of the email address passed the tumbling check and/or the gibberish check. For example, a label for an email address having firstname.lastname as the username will be adjusted to be non-manipulated, even if the username of the email address did not pass the tumbling check and/or the gibberish check.

The adjusted or confirmed label(s) are sent by the label adjuster 560 to the label customization engine 570 for label customization. The label customization engine 570 in this example generates the manipulation indication data 312 of the email address based on results of the label adjustment and the syntax check. Based on business requirements and/or intent of the email assessment request 310, the manipulation indication data 312 may include a manipulation indicator indicating whether the email address is manipulated, and/or a manipulation type indicator indicating a type of manipulation (e.g. invalid, tumbling, gibberish) for the email address.

In some examples, the email assessment request 310 seeks only whether the email address is manipulated. In some examples, the email assessment request 310 seeks both the manipulation check result and reason codes indicating a type or reason for the manipulation. In some examples, a user may want a visualization and/or summary of manipulation results for all emails of a business. The data customization engine 430 can meet all of these requirements accordingly to output the manipulation indication data 312 in a customized format.

In some examples, the email assessment request 310 can provide manipulation check results in different tiers, rather than a YES or NO. For example, among a 5-tier structure, tier 5 means the email address is most likely manipulated or is a manipulated email with highest confidence and recommended to be stopped or blocked automatically; tier 1 means the email address is safe to proceed; and tier 3 means other information associated with the account needs to be checked or verified before determining whether to block this account.

FIG. 12 is a flowchart illustrating an exemplary method 1200 for detecting email manipulation using machine learning, in accordance with some embodiments of the present teaching. In some embodiments, the method 1200 can be carried out by one or more computing devices, such as the email manipulation computing device 102 and/or the cloud-based engine 121 of FIG. 1. Beginning at operation 1202, an email assessment request regarding an email address associated with a user is received from a computing device. At operation 1204, email feature data is generated based on the email address. At operation 1206, manipulation indication data of the email address is computed using at least one machine learning model based on the email feature data. At operation 1208, the manipulation indication data of the email address is transmitted to the computing device in response to the email assessment request.

Although the methods described above are with reference to the illustrated flowcharts, it will be appreciated that many other ways of performing the acts associated with the methods can be used. For example, the order of some operations may be changed, and some of the operations described may be optional.

The methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:
a non-transitory memory having instructions stored thereon; and
at least one processor operatively coupled to the non-transitory memory, wherein the instructions, when executed, cause the at least one processor to:
receive, from a computing device, an email assessment request regarding an email address associated with a user;
generate feature data based on the email address, wherein the feature data comprises numeric features related to the email address;
execute at least one machine learning model;
input the feature data into the executed at least one machine learning model and generate manipulation indication data of the email address based on the inputted feature data, wherein the manipulation indication data comprises a manipulation type indicator indicating a type of manipulation for the email address, and wherein the at least one machine learning model is trained with labelled features generated from a plurality of email addresses to minimize a difference between outputted labels and labels in the labelled features; and
transmit, in response to the email assessment request, the manipulation indication data of the email address to the computing device.

2. The system of claim 1, wherein:
the manipulation type indicator indicates the email address is an invalid email in accordance with a determination that the email address has an invalid format;
the manipulation type indicator indicates the email address is a tumbling email in accordance with a determination that the email address is one of multiple emails that are associated with the user and sharing a similar pattern; and
the manipulation type indicator indicates the email address is a gibberish email in accordance with a determination that the email address has gibberish characters.

3. The system of claim 1, wherein the manipulation indication data is computed based on:
processing the email address to generate processed data;
performing a syntax check based on the processed data using at least one rule-based logic, wherein the at least one rule-based logic is determined based on an email provider or a domain portion of the email address; and
determining, based on the syntax check, whether the email address has a valid format.

4. The system of claim 3, wherein the manipulation indication data is computed further based on:
performing a tumbling check on the email address to determine whether the email address is one of multiple tumbling emails associated with the user, in accordance with a determination that the email address has a valid format;
performing a gibberish check on the email address to determine whether the email address is a gibberish email containing gibberish characters, in accordance with a determination that the email address has a valid format;
performing a label adjustment based on results of the tumbling check and the gibberish check; and
generating the manipulation indication data of the email address based on results of the label adjustment and the syntax check.

5. The system of claim 4, wherein performing the tumbling check on the email address comprises:
generating a plurality of feature sets based on the email address using natural language processing;
applying a plurality of rules on the plurality of feature sets to generate a rule-based label indicating whether the email address is a tumbling email, wherein:
each of plurality of rules is applied on a respective one of the plurality of feature sets to compute a respective tumbling score based on a respective threshold,
the respective threshold is pre-determined based on a quantile analysis on a feature distribution associated with emails of historical and current users,
the rule-based label is generated based on all tumbling scores computed by applying the plurality of rules,
the plurality of rules comprise: (a) at least one population-based rule related to the email address and other email addresses, and (b) at least one population-free rule related to the email address alone.

6. The system of claim 5, wherein the at least one machine learning model comprises a deep learning model, and wherein performing the tumbling check on the email address further comprises:

generating at least one numeric feature based on the email address;

transforming the email address to a gene matrix representing an evolutionary process that leads to the email address, wherein the gene matrix is generated based on an image visualization showing patterns and clusters of historical tumbling emails;

inputting the at least one numeric feature and the gene matrix to the deep learning model to generate a model-based label indicating whether the email address is a tumbling email; and determining the email address as a tumbling email in accordance with a determination that at least one of the rule-based label or model-based label indicates the email address is a tumbling email.

7. The system of claim 6, wherein the deep learning model is trained based on:

obtaining a plurality of emails associated with a plurality of users;

automatically generating, for each respective email address of the plurality of emails, a pseudo-label indicating whether the respective email address is tumbling or not;

performing a label adjustment on the generated pseudo-labels based on feedbacks from business unit, customer service and/or expert review to generate training labels;

generating gene matrices and numeric features for the plurality of emails, to form labelled training data with training labels; and training the deep learning model based on the labelled training data.

8. The system of claim 4, wherein performing the gibberish check on the email address comprises:

determining a vocabulary based on letters, digits and special characters;

extracting a username string from the email address;

processing the username string to generate a processed username;

computing, using a machine learning model, a perplexity score for the processed username based on padding, smoothing, and the vocabulary, wherein the perplexity score indicates a probability that the email address is gibberish; and generating a gibberish label indicating whether the email address is a gibberish email based on the perplexity score.

9. The system of claim 4, wherein performing the label adjustment comprises:

obtaining at least one adjustment rule that is determined based on a clustering logic, a popular username logic, and/or predetermined email domain lists;

applying the at least one adjustment rule to the result of the tumbling check to confirm or adjust a label indicating whether the email address is a tumbling email; and applying the at least one adjustment rule to the result of the gibberish check to confirm or adjust a label indicating whether the email address is a gibberish email.

10. A computer-implemented method by one or more processors, the method comprising:

receiving, by the one or more processors and from a computing device, an email assessment request regarding an email address associated with a user;

generating, by the one or more processors, feature data based on the email address, wherein the feature data comprises numeric features related to the email address;

executing, by the one or more processors, at least one machine learning model;

inputting, by the one or more processors, the feature data into the executed at least one machine learning model, and generating manipulation indication data of the email address based on the feature data, wherein the manipulation indication data comprises a manipulation type indicator indicating a type of manipulation for the email address, and wherein the at least one machine learning model is trained with labelled features generated from a plurality of email addresses to minimize a difference between outputted labels and labels in the labelled features; and transmitting, by the one or more processors and in response to the email assessment request, the manipulation indication data of the email address to the computing device.

11. The computer-implemented method of claim 10, wherein:

the manipulation type indicator indicates the email address is an invalid email in accordance with a determination that the email address has an invalid format;

the manipulation type indicator indicates the email address is a tumbling email in accordance with a determination that the email address is one of multiple emails that are associated with the user and sharing a similar pattern; and the manipulation type indicator indicates the email address is a gibberish email in accordance with a determination that the email address has gibberish characters.

12. The computer-implemented method of claim 11, wherein computing the manipulation indication data comprises:

processing the email address to generate processed data;

performing a syntax check based on the processed data using at least one rule-based logic, wherein the at least one rule-based logic is determined based on an email provider or a domain portion of the email address; and determining, based on the syntax check, whether the email address has a valid format.

13. The computer-implemented method of claim 12, wherein computing the manipulation indication data further comprises:

performing a tumbling check on the email address to determine whether the email address is one of multiple tumbling emails associated with the user, in accordance with a determination that the email address has a valid format;

performing a gibberish check on the email address to determine whether the email address is a gibberish email containing gibberish characters, in accordance with a determination that the email address has a valid format;

performing a label adjustment based on results of the tumbling check and the gibberish check; and generating the manipulation indication data of the email address based on results of the label adjustment and the syntax check.

14. The computer-implemented method of claim 13, wherein performing the tumbling check on the email address comprises:

generating a plurality of feature sets based on the email address using natural language processing;

applying a plurality of rules on the plurality of feature sets to generate a rule-based label indicating whether the email address is a tumbling email, wherein:

each of plurality of rules is applied on a respective one of the plurality of feature sets to compute a respective tumbling score based on a respective threshold, the respective threshold is pre-determined based on a quantile analysis on a feature distribution associated with emails of historical and current users, the rule-based label is generated based on all tumbling scores computed by applying the plurality of rules, the plurality of rules comprise: (a) at least one population-based rule related to the email address and other email addresses, and (b) at least one population-free rule related to the email address alone.

15. The computer-implemented method of claim 14, wherein the at least one machine learning model comprises a deep learning model, and wherein performing the tumbling check on the email address further comprises:

generating at least one numeric feature based on the email address;

transforming the email address to a gene matrix representing an evolutionary process that leads to the email address, wherein the gene matrix is generated based on an image visualization showing patterns and clusters of historical tumbling emails;

inputting the at least one numeric feature and the gene matrix to the deep learning model to generate a model-based label indicating whether the email address is a tumbling email; and determining the email address as a tumbling email in accordance with a determination that at least one of the rule-based label or model-based label indicates the email address is a tumbling email.

16. The computer-implemented method of claim 15, wherein the deep learning model is trained based on:

obtaining a plurality of emails associated with a plurality of users;

automatically generating, for each respective email address of the plurality of emails, a pseudo-label indicating whether the respective email address is tumbling or not;

performing a label adjustment on the generated pseudo-labels based on feedbacks from business unit, customer service and/or expert review to generate training labels;

generating gene matrices and numeric features for the plurality of emails, to form labelled training data with training labels; and training the deep learning model based on the labelled training data.

17. The computer-implemented method of claim 13, wherein performing the gibberish check on the email address comprises:

determining a vocabulary based on letters, digits and special characters;

extracting a username string from the email address;

processing the username string to generate a processed username;

computing, using a machine learning model, a perplexity score for the processed username based on padding, smoothing, and the vocabulary, wherein the perplexity score indicates a probability that the email address is gibberish; and generating a gibberish label indicating whether the email address is a gibberish email based on the perplexity score.

18. The computer-implemented method of claim 13, wherein performing the label adjustment comprises:

obtaining at least one adjustment rule that is determined based on a clustering logic, a popular username logic, and/or predetermined email domain lists;

applying the at least one adjustment rule to the result of the tumbling check to confirm or adjust a label indicating whether the email address is a tumbling email; and applying the at least one adjustment rule to the result of the gibberish check to confirm or adjust a label indicating whether the email address is a gibberish email.

19. A non-transitory computer readable medium having instructions stored thereon, wherein the instructions, when executed by at least one processor, cause at least one device to perform operations comprising:

receiving, from a computing device, an email assessment request regarding an email address associated with a user;

generating feature data based on the email address;

computing, using at least one machine learning model, manipulation indication data of the email address based on the feature data, wherein the manipulation indication data comprises a manipulation type indicator indicating a type of manipulation for the email address, and wherein the at least one machine learning model is trained with labelled features generated from a plurality of email addresses to minimize a difference between outputted labels and labels in the labelled features; and transmitting, in response to the email assessment request, the manipulation indication data of the email address to the computing device.

20. The non-transitory computer readable medium of claim 19, wherein:

the manipulation type indicator indicates the email address is an invalid email in accordance with a determination that the email address has an invalid format;

the manipulation type indicator indicates the email address is a tumbling email in accordance with a determination that the email address is one of multiple emails that are associated with the user and sharing a similar pattern; and the manipulation type indicator indicates the email address is a gibberish email in accordance with a determination that the email address has gibberish characters.

* * * * *